United States Patent
Tagami et al.

(10) Patent No.: US 9,457,341 B2
(45) Date of Patent: Oct. 4, 2016

(54) METHOD OF MANUFACTURING FERROUS OXIDE NANOPARTICLE, METHOD OF FORMING CARBON NANOTUBE, AND FERROUS OXIDE NANOPARTICLE

(71) Applicant: Aisin Seiki Kabushiki Kaisha, Kariya (JP)

(72) Inventors: Tomoya Tagami, Anjo (JP); Eiji Nakashima, Utsunomiya (JP); Gang Xie, Anjo (JP); Saeki Yamamuro, Matsuyama (JP); Naoyuki Aratani, Fuji (JP); Takashi Nishikawa, Matsuyama (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 116 days.

(21) Appl. No.: 14/224,792

(22) Filed: Mar. 25, 2014

(65) Prior Publication Data

US 2014/0294715 A1 Oct. 2, 2014

(30) Foreign Application Priority Data

Mar. 27, 2013 (JP) .................................. 2013-065451
Feb. 3, 2014 (JP) .................................. 2014-018773

(51) Int. Cl.
| | | |
|---|---|---|
| C01G 49/00 | (2006.01) | |
| B01J 23/745 | (2006.01) | |
| C22B 3/16 | (2006.01) | |

(Continued)

(52) U.S. Cl.
CPC ............. B01J 23/745 (2013.01); B01J 35/002 (2013.01); B01J 35/006 (2013.01); B01J 35/0013 (2013.01); B82Y 30/00 (2013.01); B82Y 40/00 (2013.01); C01B 31/0233 (2013.01); C01G 49/04 (2013.01); C22B 3/165 (2013.01); C01P 2002/72 (2013.01); C01P 2004/04 (2013.01); C01P 2004/64 (2013.01)

(58) Field of Classification Search
None
See application file for complete search history.

(56) References Cited

U.S. PATENT DOCUMENTS

| | | | | |
|---|---|---|---|---|
| 7,829,140 | B1 * | 11/2010 | Zhong | A61K 49/183 427/212 |
| 2005/0191231 | A1 * | 9/2005 | Sun | H01F 1/0054 423/632 |
| 2007/0140951 | A1 * | 6/2007 | O'Brien | A61K 8/19 423/592.1 |

FOREIGN PATENT DOCUMENTS

| | | |
|---|---|---|
| JP | 2008-138245 | 6/2008 |
| JP | 2009-215146 | 9/2009 |
| JP | 2009-227470 | 10/2009 |

OTHER PUBLICATIONS

Partial European Search Report issued on Jul. 7, 2014 in the corresponding European Appl. No. 14161645.8.

(Continued)

*Primary Examiner* — Steven Bos
(74) *Attorney, Agent, or Firm* — Oblon, McClelland, Maier & Neustadt, L.L.P.

(57) ABSTRACT

A method of manufacturing a ferrous oxide nanoparticle includes a water removing step raising temperature of a solution containing an iron oxide, an organic acid dissolving the iron oxide, and a first solvent to a first temperature and removing water in the solution, a second temperature maintaining step raising the first temperature to a second temperature and maintaining the second temperature, and a particle extracting step extracting the ferrous oxide nanoparticle from the solution after the second temperature maintaining step.

14 Claims, 19 Drawing Sheets

(51) Int. Cl.
  *C01B 31/02* (2006.01)
  *C01G 49/04* (2006.01)
  *B82Y 30/00* (2011.01)
  *B82Y 40/00* (2011.01)
  *B01J 35/00* (2006.01)

(56) References Cited

OTHER PUBLICATIONS

Yanglong Hou, et al., "Controlled Synthesis and Chemical Conversions of FeO Nanoparticles", Angewandte Chemie, Reactions of FeO Nanoparticles, DOI: 10.1002/ange.200701694; vol. 119, No. 33, XP055125058, Aug. 20, 2007, pp. 6445-6448.

Hafsa Khurshid, et al., "Synthesis and magnetic properties of core/shell FeO/Fe$_3$O$_x$ nano-octopods", Journal of Applied Physics, vol. 113, No. 17, 17B508, XP012173755, Mar. 15, 2013, 3 pages.

Lyudmila M. Bronstein, et al., "Influence of Iron Oleate Complex Structure on Iron Oxide Nanoparticle Formation", Chem. Mater, vol. 19, No. 15, XP055124940, Jun. 30, 2007, pp. 3624-3632.

S. Yamamura "Solution-phase Synthesis of Magnetic Iron Oxide Nanoparticles from Hematite Powder", The Ceramic Society of Japan, 2009, 2 pages.

* cited by examiner

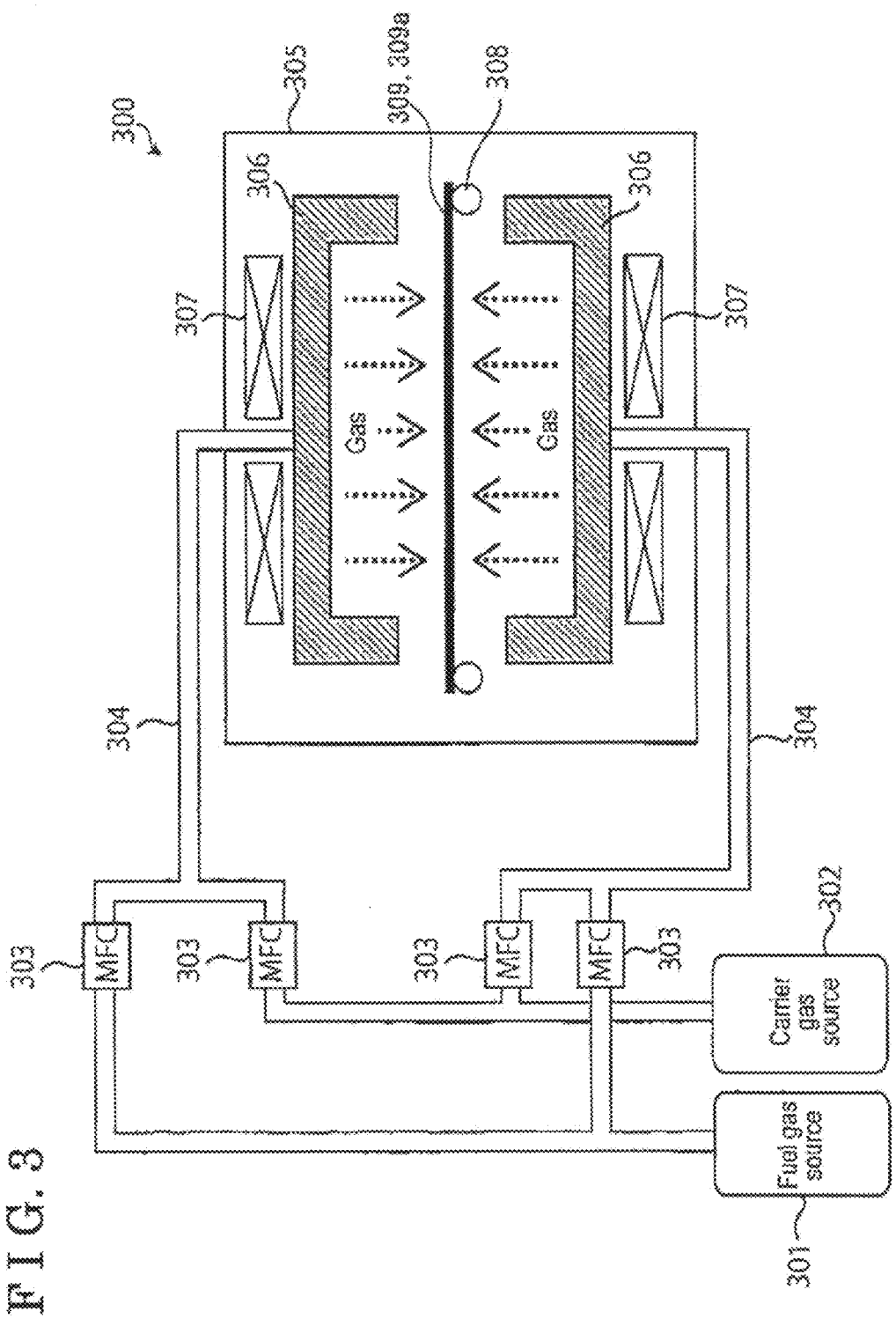

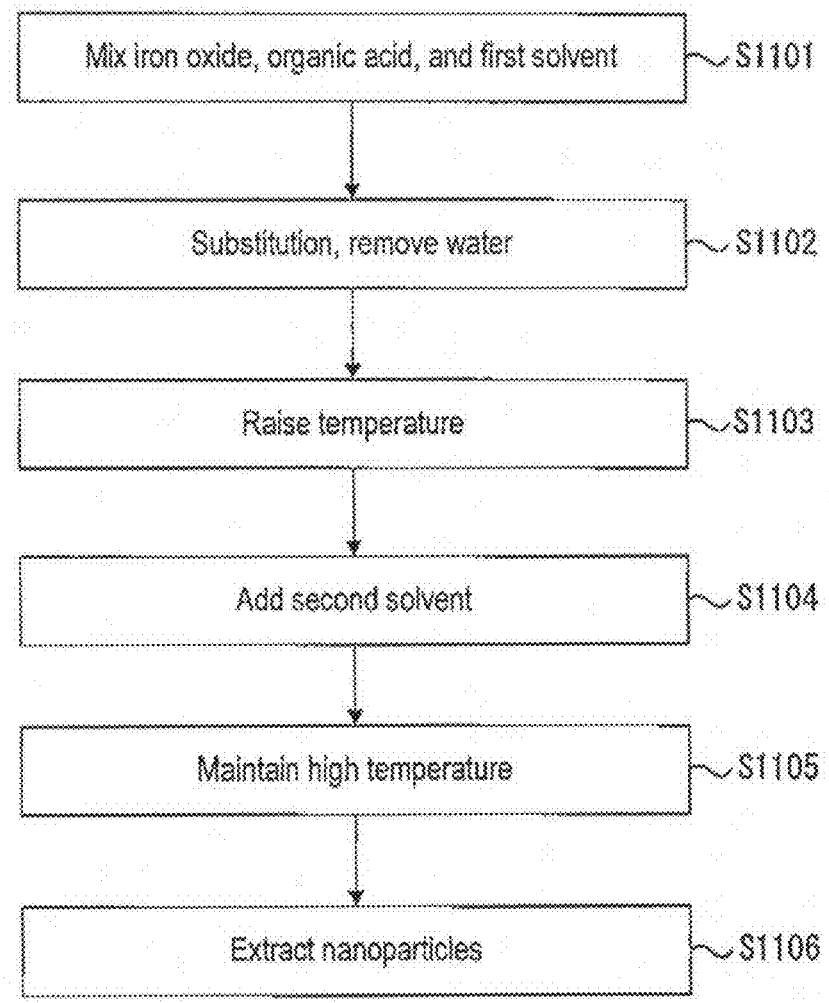
F I G. 11

F I G. 13 A
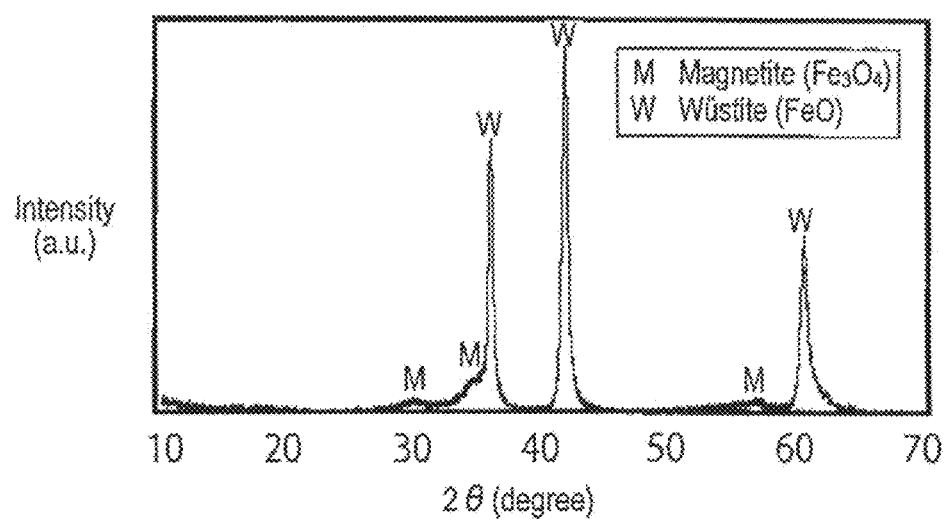

METHOD OF MANUFACTURING FERROUS OXIDE NANOPARTICLE, METHOD OF FORMING CARBON NANOTUBE, AND FERROUS OXIDE NANOPARTICLE

CROSS REFERENCE TO RELATED APPLICATIONS

This application is based on and claims priority under 35 U.S.C. §119 to Japanese Patent Application 2013-065451, filed on Mar. 27, 2013, and to Japanese Patent Application 2014-018773, filed on Feb. 3, 2014 the entire content of which are incorporated herein by reference.

TECHNICAL FIELD

This disclosure generally relates to a method of manufacturing a ferrous oxide (FeO) nanoparticle, a method of forming a carbon nanotube, and the ferrous oxide (FeO) nanoparticle.

BACKGROUND DISCUSSION

A technology for manufacturing a carbon nanotube by chemically manufacturing an Fe nanoparticle and using the Fe nanoparticle as a catalyst is known. For example, JP2009-215146A, hereinafter referred to as Reference 1, discloses a technology for manufacturing an Fe nanoparticle of $Fe_2O_3$ having a particle size, or a particle diameter, equal to or less than 10 nanometers (nm) in diameter from a metallic precursor, a surfactant, and a solvent as basic materials. A technical paper entitled "Solution-phase Synthesis of Magnetic Iron Oxide Nanoparticles from Hematite Powder" published on page 402 in the proceeding of the 22nd Fall Meeting of the Ceramic Society of Japan, hereinafter referred to as Non-patent literature 1, discloses a technology for manufacturing Fe nanoparticles of $Fe_3O_4$ having a particle diameter equal to or less than 20 nm by controlling ratio of an iron oxide and an oleic acid in a mixture of the iron oxide, the oleic acid, and 1-octadecene. A liquid-phase method is suitable for manufacturing Fe nanoparticles in large quantities, however, manufacturing a ferrous oxide (FeO) nanoparticle, or an Iron(II) oxide nanoparticle, by using a liquid-phase method is considered difficult. In addition, as disclosed in JP2009-227470A, hereinafter referred to as Reference 2, a process of forming a carbon nanotube by using an iron oxide particle is known to include a fast initial growth process and a slow growth process that comes thereafter. Furthermore, using an Fe nanoparticle having a large particle diameter as a catalyst so as to manufacture a carbon nanotube having a large outer diameter is known to decrease growth potential of the carbon nanotube, which is considered as a drawback.

A need thus exists for a method of manufacturing a ferrous oxide nanoparticle, a method of forming a carbon nanotube, and the ferrous oxide nanoparticle which is not susceptible to the drawbacks mentioned above.

SUMMARY

A method of manufacturing a ferrous oxide nanoparticle includes a water removing step raising temperature of a solution containing an iron oxide, an organic acid dissolving the iron oxide, and a first solvent to a first temperature and removing water in the solution, a second temperature maintaining step raising the first temperature to a second temperature and maintaining the second temperature, and a particle extracting step extracting the ferrous oxide nanoparticle from the solution after the second temperature maintaining step.

A method of forming a carbon nanotube includes the steps of producing a catalyst supporting base plate supporting a ferrous oxide nanoparticle on a base plate, the ferrous oxide nanoparticle manufactured by using a liquid-phase method and having a ferrous oxide structure as main component and having a particle size equal to or larger than 17 nanometers in diameter, and of forming a carbon nanotube on the catalyst supporting base plate.

A ferrous oxide nanoparticle is manufactured by using a liquid-phase method, the ferrous oxide nanoparticle having a ferrous oxide structure as main component and having a particle size equal to or larger than 17 nanometers in diameter.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a schematic view drawing illustrating a carbon nanotube manufacturing apparatus for use in the method of manufacturing the FeO nanoparticle, the method of forming the carbon nanotube, and the FeO nanoparticle according to the first embodiment;

FIG. 11 is a flowchart showing the method of manufacturing the FeO nanoparticle according to a second embodiment;

FIG. 13A is an X-ray diffraction pattern for a sixth practical example;

DETAILED DESCRIPTION

Figure 1:
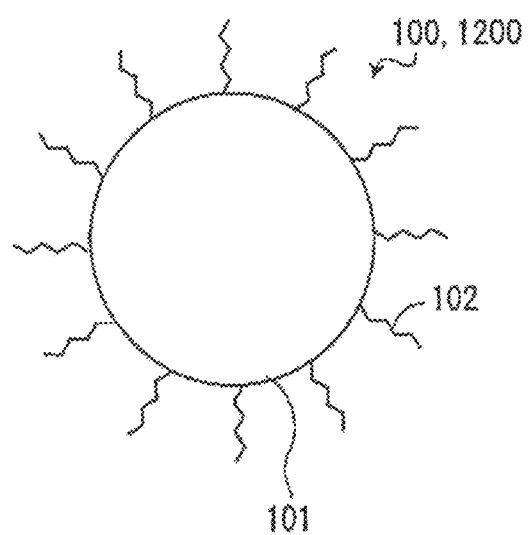
FIG. 1 is a schematic view of a ferrous oxide (FeO) nanoparticle according to a first and a second embodiments.

A method of manufacturing a ferrous oxide (FeO) nanoparticle 100, 1200, a method of forming the carbon nanotube 402, 502, 1004, 1302, and the ferrous oxide (FeO) nanoparticle 100, 1200 according to exemplary embodiments will be described in detail referring to drawings. The ferrous oxide (FeO) is also referred to as an Iron(II) oxide. Measurements, materials, forms and positions of components relative to each other for describing the embodiments are selective and may be altered in accordance with the structure of an apparatus and other conditions used in the method of manufacturing the ferrous oxide (FeO) nanoparticle 100, 1200, the method of forming the carbon nanotube 402, 502, 1004, 1302, and the ferrous oxide (FeO) nanoparticle 100, 1200. Unless specified otherwise, the scope of this disclosure is not limited to the embodiments that will be described in this disclosure. Components for describing the embodiments are provided with reference numerals indicated in the drawings. Components common between different embodiments are provided with the same reference numerals and repetitive descriptions of the component once described on describing an embodiment may be omitted on describing other embodiments.

The method of manufacturing the ferrous oxide (FeO) nanoparticle 100, the method of forming the carbon nanotube 402, 502, 1400, and the ferrous oxide (FeO) nanoparticle 100 according to a first embodiment will be described. FIG. 1 is a schematic view of the ferrous oxide (FeO) nanoparticle 100, 1200, or the Iron(II) oxide nanoparticle, according to the first and the second embodiments. The FeO nanoparticle 100, 1200 according to the first and the second embodiments possesses plural iron (Fe) atoms and plural oxygen (O) atoms and includes a ferrous oxide (FeO) core 101 having a ferrous oxide (FeO) structure, or a wüstite, as main component. The FeO nanoparticle 100, 1200 may include a surfactant 102 adhering to at least one atom composing the FeO core 101.

Figure 2A:
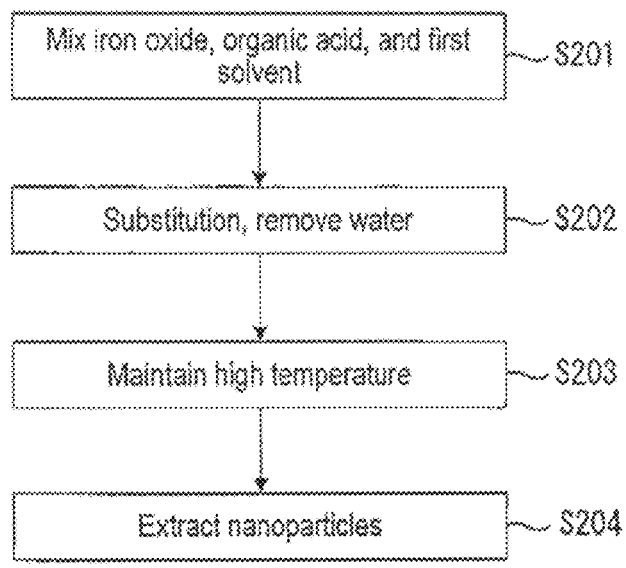
FIG. 2A is a flowchart showing the method of manufacturing the FeO nanoparticle according to the first embodiment.
Figure 2B:
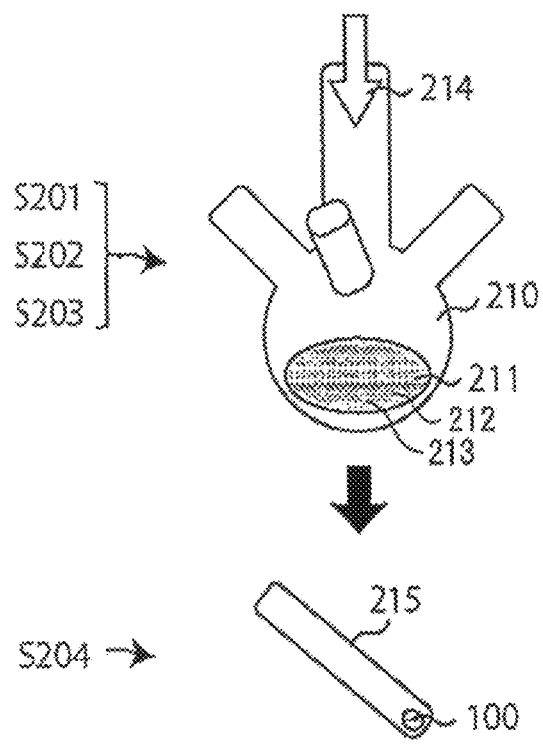
FIG. 2B is a schematic view drawing illustrating the method of manufacturing the FeO nanoparticle according to the first embodiment.

The method of manufacturing the ferrous oxide (FeO) nanoparticle 100 according to a first embodiment will be described first. FIG. 2A is a flowchart showing the method of manufacturing the FeO nanoparticle 100 according to the first embodiment. FIG. 2B is a schematic view drawing illustrating the method of manufacturing the FeO nanoparticle 100 according to the first embodiment. The method of manufacturing the FeO nanoparticle 100 according to the first embodiment and the method of manufacturing the FeO nanoparticle 100 in first to fifth practical examples according to the first embodiment use a method known as a liquid-phase method.

In step S201, an iron oxide 211, which is the basic material for forming the FeO core 101, an organic acid 212, and a first solvent 213 are mixed in a flask 210, for example, a three-necked flask or a four-necked flask. Examples of the iron oxide 211 are FeO, $\alpha$-$Fe_2O_3$, $\gamma$-$Fe_2O_3$, $Fe_3O_4$, and $\alpha$-FeOOH. The organic acid 212 is the surfactant 102 that dissolves the iron oxide 211 and adheres to the surface of the FeO core 101. The surfactant 102 restrains the FeO nanoparticles 100 from clumping together and stabilizes the surface condition of the FeO nanoparticle 100. Examples of the organic acid 212 are a long-chain polyunsaturated fatty acid, for example, an oleic acid and a linoleic acid, and a saturated long chain fatty acid, for example, a stearic acid. The first solvent 213 is favorably a non-polar solvent having a boiling point equal to or higher than 210° C. Examples of the first solvent 213 are 1-octadecene and dodecane.

A molar ratio between the organic acid 212 and the iron oxide 211 that are mixed in the flask 210 is obtained from experiences. The molar ratio here is the organic acid/the iron oxide. In a case where the amount of the organic acid 212 is too large relative to the amount of the iron oxide 211, formed FeO nanoparticles 100 dissolve. In a case where the amount of the organic acid 212 is too small relative to the amount of the iron oxide 211, a core for forming the FeO nanoparticle 100 may not be formed. Accordingly, favorable molar ratio (the organic acid/the iron oxide) between the organic acid 212 and the iron oxide 211 is a value between 6 and 100. In addition, the amount of the first solvent 213 favorably is an amount forming a solution having a concentration that does not affect the reaction. For example, in a case where the amount of the first solvent 213 is too large relative to the amount of the iron oxide 211 or to the amount of the organic acid 212, the core for forming the FeO nanoparticle 100 may not be formed.

In the next step S202, which serves as a water removing step, after the atmosphere in the flask 210 is substituted with an inactive gas 214, for example, argon or nitrogen, water in the solution in the flask 210 is removed by raising the temperature of the solution in the flask 210 to a first temperature. The first temperature is a temperature equal to or higher than the boiling point of water. The first temperature favorably is the temperature between 100° C. and 130° C.

In step S203, which serves as a second temperature maintaining step, the temperature of the solution in the flask 210 is raised from the first temperature to a second temperature while churning the solution in the flask 210. The second temperature is maintained and the churning is continued for a predetermined length of synthesis time. The flask 210 may be configured with a condenser attached to an upper portion of the flask 210 so as to cool the evaporating first solvent 213 and so as to make the first solvent 213 reflux into the flask 210 during this period. After that, the temperature of the solution in the flask 210 is lowered to a room temperature and a reacted solution in which the FeO nanoparticles 100 are dispersed is removed from the flask 210.

The second temperature, which is a temperature equal to or lower than the boiling point of the first solvent 213, is obtained from experiences. In a case where the second temperature is too low, the FeO core 101 may not be formed. The second temperature is a temperature in consideration of the temperature in which the FeO core 101 forms and the boiling point of the first solvent 213. Accordingly, the second temperature favorably is a temperature between 280° C. and 360° C. The predetermined length of synthesis time is a sum of a first maintaining time and a second maintaining time. The first maintaining time is a length of time from a point in time at which the temperature of the solution in the flask 210 reaches the second temperature to a point in time at which the color of the solution changes. The second maintaining time is a length of time from the point in time at which the color of the solution changes to a point in time at which the churning is ended, in other words to the point in time at which the reaction is ended. The first maintaining time varies in accordance with the amount of the organic acid 212. As an example in a case where an oleic acid is used as the organic acid 212, the first maintaining time is a length of time from a point in time at which the temperature of the solution reaches the second temperature to a point in time at which the color of the solution changes from red to black.

In step S204, which serves as a particle extracting step, the reacted solution in which the FeO nanoparticles 100 are dispersed is displaced to a centrifuge tube 215 and with, for example, an ethanol or a hexane, and by using a centrifugal machine, unreacted substances are removed from the reacted solution through a refinement process so as to extract the FeO nanoparticles 100 in a paste form. The extracted FeO nanoparticles 100 may be dried into a powder form at this time. The particle diameter of the FeO nanoparticles 100 is measured by using, for example, a transmission electron microscope (TEM) or a scanning electron microscope (SEM), or by optical absorptiometry.

An apparatus for forming a carbon nanotube will be described next. FIG. 3 is a schematic drawing illustrating a manufacturing apparatus 300 for use in manufacturing the carbon nanotube 402, 502, 1004 manufactured by the method of forming the carbon nanotube 402, 502, 1004 according to the first embodiment. The manufacturing apparatus 300 for use in the method of forming the carbon nanotube 402, 502, 1004 according to the first embodiment is not limited to the manufacturing apparatus 300 illustrated in FIG. 3.

The manufacturing apparatus 300 includes a fuel gas source 301, a carrier gas source 302, mass flow controllers (MFC) 303 connected to the fuel gas source 301 and to the carrier gas source 302 via gas introduction pipes 304, and a chamber 305 connected to the gas introduction pipes 304. The chamber 305 includes shower plates 306 connected to the gas introduction pipes 304, heaters 307 positioned around the shower plates 306 and a base plate holder 308 for retaining a base plate 309. The fuel gas source 301 supplies a fuel gas containing, for example, alkane or the like aliphatic hydrocarbon or alcohol or the like aliphatic compound as a source of carbon for manufacturing the carbon nanotubes 402, 502, 1004. The carrier gas source 302 supplies a carrier gas containing argon, nitrogen, or the like inactive gas. The mass flow controllers (MFC) 303 control flow amounts of the fuel gas and the carrier gas so that a gas in mixture of the fuel gas and the carrier gas in a predetermined ratio is supplied to the shower plates 306. The shower plates 306 evenly supplies the gas in mixture to the base plate 309 positioned at the base plate holder 308. The heaters 307 heat inside the chamber 305 so as to control the surface temperature of the base plate 309.

The method of forming the carbon nanotube 402, 502, 1004 according to the first embodiment will be described next. The carbon nanotubes 402, 502, 1004 are formed with FeO nanoparticles 100 serving as catalysts being supported on the base plate 309, which is made of, for example, metal, ceramics, silicon, or a metallic foil.

As a first step for forming the carbon nanotube 402, 502, 1004, a catalyst supporting base plate 309a is produced. The FeO nanoparticles 100 are dispersed, for example, in hexane and the concentration of the FeO nanoparticles 100 in the liquid is controlled so that the absorbance of light becomes a predetermined value when measured by a colorimeter. The base plate 309, or alternatively a metallic foil, is immersed in the liquid containing the FeO nanoparticles 100 being dispersed therein and pulled out of the liquid with a predetermined pull-out speed. In a case in which the pull-out speed is slow, the density of the FeO nanoparticles 100 being supported on the base plate is relatively increased. On the other hand, in a case in which the pull-out speed is fast, the density of the FeO nanoparticles 100 being supported on the base plate is relatively decreased. After the base plate 309 is pulled out, for example, hexane is made to evaporate from the base plate 309. Accordingly, the catalyst supporting base plate 309a supporting the FeO nanoparticles 100 is produced. Alternatively, a liquid containing the FeO nanoparticles 100 dispersed therein may be sprayed on the base plate 309 or may be applied on the base plate 309 by spin coating to produce the catalyst supporting base plate 309a.

Then, the catalyst supporting base plate 309a supporting the FeO nanoparticles 100 is positioned at the base plate holder 308 in the chamber 305. After the chamber 305 is vacuumed, the temperature inside the chamber 305 is heated to a predetermined temperature. The gas in mixture of the fuel gas and the carrier gas in the predetermined ratio is supplied to the catalyst supporting base plate 309a via the shower plates 306. While supplying the gas in mixture, the surface temperature of the catalyst supporting base plate 309a is controlled so as to manufacture, or form, the carbon nanotubes 402, 502, 1004 on the catalyst supporting base plate 309a.

A first practical example according to this disclosure will be described. Manufacturing of the FeO nanoparticle 100 will be described first. In the first practical example, the FeO nanoparticles 100 are manufactured by using $Fe_2O_3$ powder as the iron oxide 211, an oleic acid as the organic acid 212, and 1-octadecene as the first solvent 213.

In step S201, 3 millimoles (mmol) of the iron oxide 211 ($Fe_2O_3$ powder), 90 mmol of the oleic acid, 20 milliliters (ml) of 1-octadecene are mixed in a flask 210, which is four-necked. The atmosphere in the flask 210 is then substituted with an argon gas for 60 minutes. After that, in step S202, the temperature of the solution in the flask 210 is raised to 130° C. for 30 minutes and removed water in the solution. In step S203, the temperature of the solution in the flask 210 is raised to 320° C. by using a heater, for example, a mantle heater, and maintained at 320° C. for eight hours of synthesis time while churning the solution in the flask 210 for reactions to occur. After that, the temperature of the solution in the flask 210 is lowered to the room temperature and the reacted solution in which Fe nanoparticles are dispersed is removed from the flask 210. The first temperature, which is 130° C., is raised so as to reach the second temperature, which is 320° C., by taking 20 minutes.

In step S204, in order to remove unreacted substances, the reacted solution is placed in a centrifuge tube 215 and centrifuged at the rotational speed of 1500 revolutions per minute (rpm) for 20 minutes. After that a supernatant solution containing the Fe nanoparticles is separated and the supernatant solution, hexane, and ethanol are mixed in another centrifuge tube 215 in ratio of 1:1:2 and centrifuged at the rotational speed of 5800 rpm for 30 minutes. The processes of separating the supernatant solution, of mixing the supernatant solution, hexane, and ethanol, and of centrifugation are repeated for three to four times and the precipitated Fe nanoparticles in paste form are extracted.

Figure 4A:
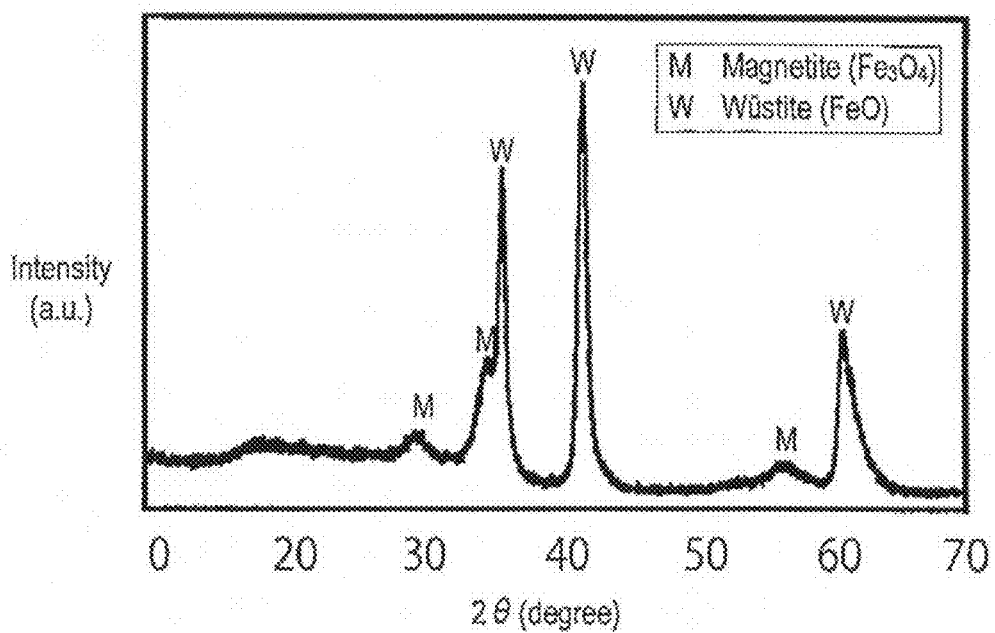
FIG. 4A is an X-ray diffraction pattern for a first practical example.

FIG. 4A is an X-ray diffraction pattern of the Fe nanoparticles for the first practical example. Relatively weak diffraction peaks due to $Fe_3O_4$ structures, in other words due to magnetites, which are indicated with M in FIG. 4A, and relatively strong diffraction peaks due to the ferrous oxide (FeO) structures, in other words due to wüstites, which are indicated with W in FIG. 4A, are recognized in the X-ray diffraction pattern. Therefore, a large amount of the Fe nanoparticles extracted in the first practical example is recognized as the FeO nanoparticles 100.

Figure 4B:
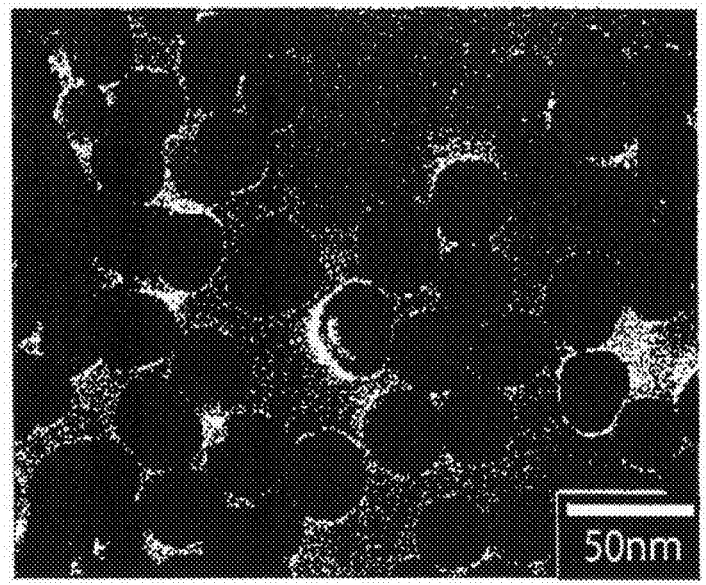
FIG. 4B is a transmission electron microscope image of the FeO nanoparticles manufactured in the first practical example.

FIG. 4B is a transmission electron microscope (TEM) image of the FeO nanoparticles 100 manufactured in the first practical example. The TEM image shows that the average particle diameter of the FeO nanoparticles 100 manufactured in the first practical example is 30 nm.

Forming of the carbon nanotube 402 will be described next. In the first practical example, the carbon nanotubes 402 are formed by using the FeO nanoparticles 100 manufactured in the first practical example as catalysts. First, the FeO nanoparticles 100 are dispersed in hexane and the concentration of the FeO nanoparticles 100 in the liquid is controlled so that the absorbance of light becomes 0.74 when measured by the colorimeter (CO7500 manufactured by WPA) under the measurement condition of wavelength of 680 nm. A silicon base plate (manufactured by SAMCO) is immersed in the liquid containing the FeO nanoparticles 100 being dispersed therein, the liquid in which the concentration is controlled, and then the silicon base plate is pulled out of the liquid into air under the room temperature with a speed of 3 millimeters/minute. After that, the silicon base plate is dried naturally and hexane is evaporated. Accordingly, a catalyst supporting base plate 401 supporting the FeO nanoparticles 100 is produced.

Then, the catalyst supporting base plate 401 supporting the FeO nanoparticles 100 is arranged in the chamber 305 of the manufacturing apparatus 300 and then the chamber 305 is vacuumed until the pressure inside of the chamber 305 becomes 10 pascal (Pa). After that, a nitrogen gas serving as the carrier gas is introduced into the chamber 305 at the flow rate of 2.5 liters/minute so as to control the pressure inside of the chamber 305 becomes 96 kilopascal (kPa). Then, the surface temperature of the catalyst supporting base plate 401 is raised so as to reach 850° C. by taking 10 minutes and an acetylene gas serving as the fuel gas is added to the nitrogen gas at the flow rate of 0.5 liters/minute for 25 minutes into the chamber 305. As a result, the carbon nanotubes 402 are formed on the catalyst supporting base plate 401.

Figure 4C:
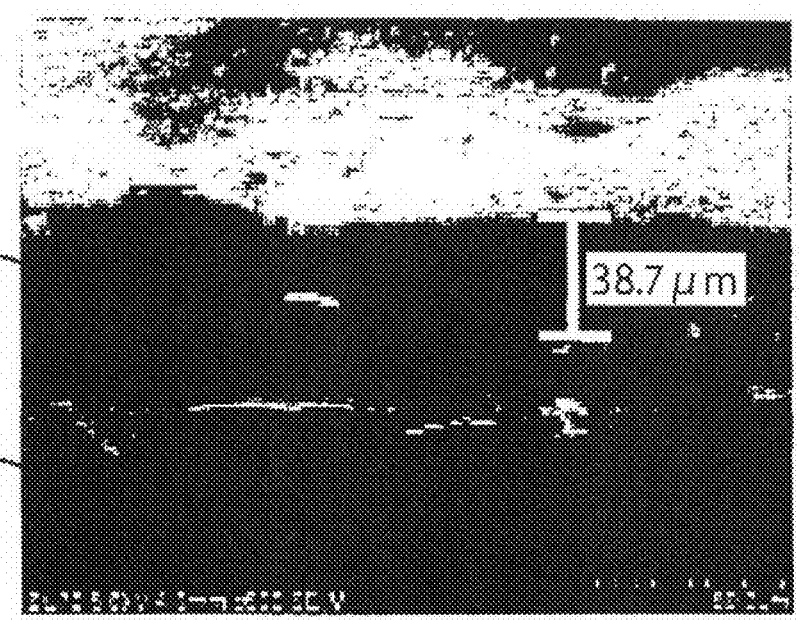
FIG. 4C is a scanning electron microscope image of the carbon nanotubes formed in the first practical example.

FIG. 4C is a scanning electron microscope (SEM) image of the carbon nanotubes 402 formed by using the catalyst supporting base plate 401 supporting the FeO nanoparticles 100 manufactured in the first practical example. The length of the carbon nanotubes 402 formed on the catalyst supporting base plate 401 supporting the FeO nanoparticles 100 manufactured in the first practical example having the average particle diameter of 30 nm is approximately 38.7 micrometers (μm).

Figure 4D:
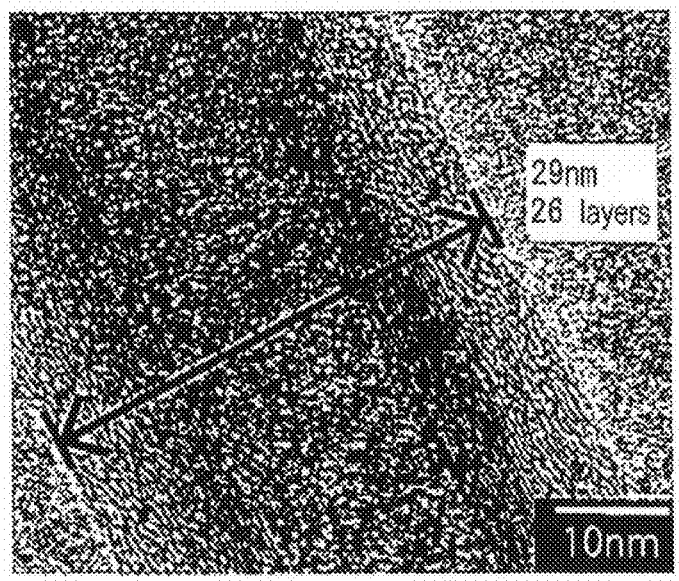
FIG. 4D is a transmission electron microscope image of carbon nanotube formed in the first practical example.

FIG. 4D is a TEM image of the carbon nanotube 402 formed by using the catalyst supporting base plate 401 supporting the FeO nanoparticles 100 manufactured in the first practical example. The outer diameter of the carbon nanotube 402 is approximately 29 nm and number of layers of the carbon nanotube 402 is approximately 26. The outer diameter of the carbon nanotube 402, which is approximately 29 nm, is approximately the same as the average particle diameter of the FeO nanoparticle 100 that served as the catalyst, which is approximately 30 nm.

A first comparison example for comparing with practical examples according to this disclosure will be described. In the first comparison example, Fe nanoparticles are manufactured with same materials, in other words with the $Fe_2O_3$ powder, the oleic acid, and 1-octadecene, and under same manufacturing condition as in the first practical example except in the synthesis time, which is changed to five hours, so as to manufacture the Fe nanoparticles having smaller particle diameter compared to that of the first practical example.

First, 3 mmol of the iron oxide 211 ($Fe_2O_3$ powder), 18 mmol of the oleic acid, 20 ml of 1-octadecene are mixed in a flask 210, which is four-necked. The atmosphere in the flask 210 is then substituted with an argon gas for 60 minutes. After that, the temperature of the solution in the flask 210 is raised to 130° C. for 30 minutes and removed water in the solution. Then, the temperature of the solution in the flask 210 is raised to 320° C. and maintained at 320° C. for five hours while churning the solution in the flask 210 for reactions to occur. After that, the temperature of the solution in the flask 210 is lowered to the room temperature and the reacted solution in which Fe nanoparticles are dispersed is removed from the flask 210. Precipitated Fe nanoparticles are extracted through a refinement process for the reacted solutions by using the same method as the method used in the first practical example. The first temperature, which is 130° C., is raised so as to reach the second temperature, which is 320° C., by taking 20 minutes.

Figure 5A:
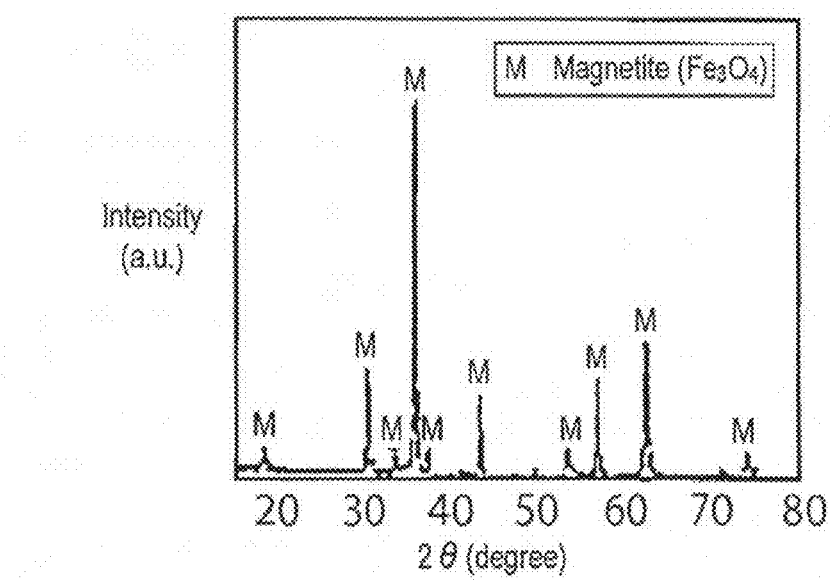
FIG. 5A is an X-ray diffraction pattern for a first comparison example.

FIG. 5A is an X-ray diffraction pattern of the extracted Fe nanoparticles for the first comparison example. Diffraction peaks due to the $Fe_3O_4$ structures, in other words due to the magnetites, which are indicated with M in FIG. 5A, are recognized in the X-ray diffraction pattern. On the other hand, the diffraction peak due to the FeO structure, in other words due to the wüstite, is scarcely recognized. Therefore, the Fe nanoparticles extracted in the first comparison example are recognized as the $Fe_3O_4$ nanoparticles.

Figure 5B:
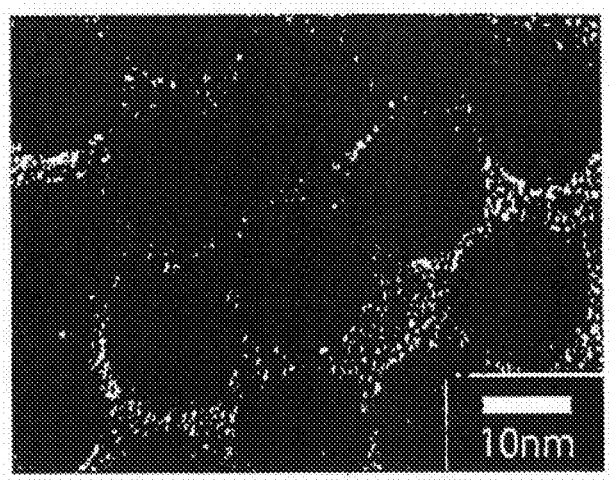
FIG. 5B is a transmission electron microscope image of $Fe_3O_4$ nanoparticles manufactured in the first comparison example.

FIG. 5B is a TEM image of the $Fe_3O_4$ nanoparticles manufactured in the first comparison example. The TEM image shows that the average particle diameter of the $Fe_3O_4$ nanoparticles manufactured in the first comparison example is 15 nm.

The catalyst supporting base plate 501 supporting the $Fe_3O_4$ nanoparticles manufactured in the first comparison example is produced by using the same method as the method used in the first practical example. The carbon nanotubes 502 are formed by using the catalyst supporting base plate 501 under the same conditions as the conditions defined in the first practical example.

Figure 5C:
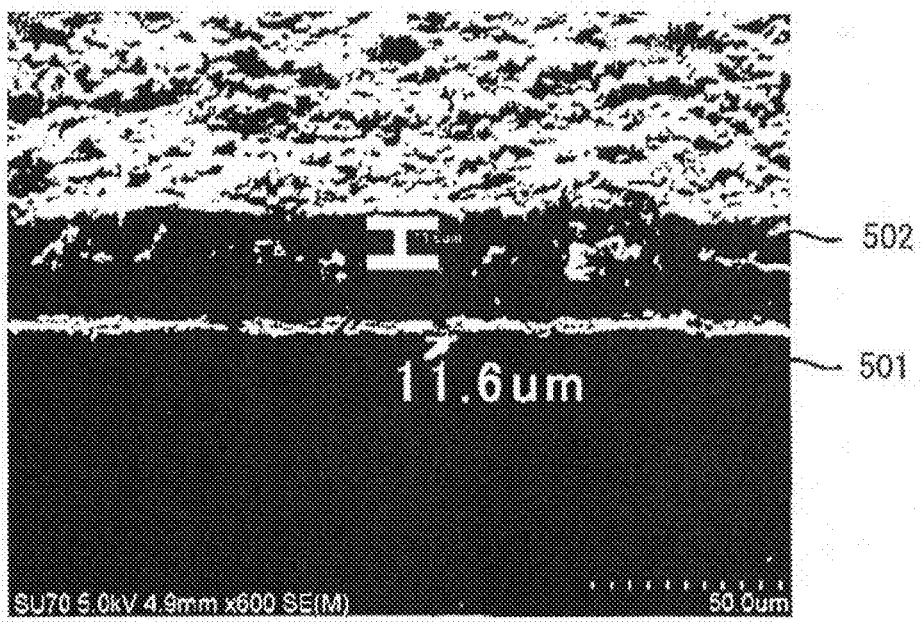
FIG. 5C is a scanning electron microscope image of carbon nanotubes formed in the first comparison example.

FIG. 5C is a SEM image of the carbon nanotubes 502 formed by using the catalyst supporting base plate 501 supporting the $Fe_3O_4$ nanoparticles manufactured in the first comparison example. The length of the carbon nanotubes 502 formed on the catalyst supporting base plate 501 supporting the $Fe_3O_4$ nanoparticles manufactured in the first comparison example having an average particle diameter of 15 nm is approximately 11.6 μm.

Figure 5D:
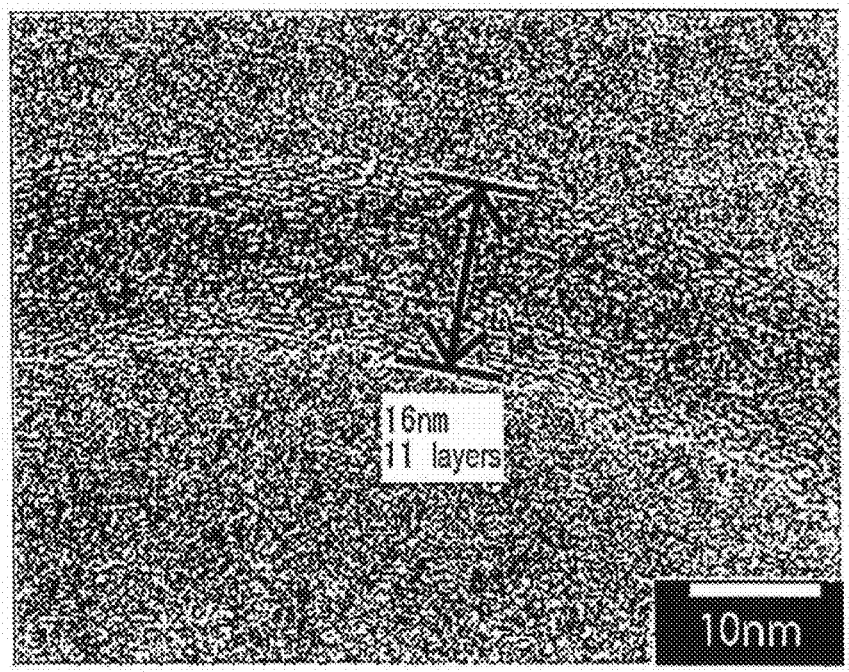
FIG. 5D is a transmission electron microscope image of the carbon nanotube formed in the first comparison example.

FIG. 5D is a TEM image of the carbon nanotube 502 formed by using the $Fe_3O_4$ nanoparticles manufactured in the first comparison example. The outer diameter of the carbon nanotube 502 is approximately 16 nm and number of layers of the carbon nanotube 502 is 11. The outer diameter of the carbon nanotube 402, which is approximately 16 nm, is approximately the same as the average particle diameter of $Fe_3O_4$ nanoparticle that served as the catalyst, which is approximately 15 nm.

Comparisons are made between the results of the first practical example and the results of the first comparison example. By comparing the Fe nanoparticles manufactured in the first practical example with the Fe nanoparticles manufactured in the first comparison example, the Fe nanoparticle having approximately 30 nm particle diameter manufactured in the first practical example is the FeO nanoparticle 100 with the FeO structure, or the wüstite, as main component, while the Fe nanoparticle having approximately 15 nm particle diameter manufactured in the first comparison example is the $Fe_3O_4$ nanoparticle with the $Fe_3O_4$ structure, or the magnetite, as main component. The results lead to a recognition that the Fe nanoparticle forms the FeO structure (the wüstite), or the $Fe_3O_4$ structure (the magnetite), depending on the particle size of the Fe nanoparticle.

By comparing the growth performances, which are compared by comparing the lengths of the carbon nanotubes 402, 501 formed by using the catalyst supporting base plates 401, 501 supporting Fe nanoparticles having different particle diameters and formed under the same conditions for forming the carbon nanotubes 402, 501, the growth performance of the carbon nanotubes 402 formed by using the catalyst supporting base plate 401 supporting the FeO nanoparticles 100 in which the length of the carbon nanotubes 402 is approximately 38.7 μm is approximately three times greater than the growth performance of the carbon nanotubes 502 formed by using the catalyst supporting base plate 501 supporting the $Fe_3O_4$ nanoparticles in which the length of the carbon nanotubes 502 is approximately 11.6 μm. The results lead to a recognition that the Fe nanoparticles with the FeO structure as the main component, in other words the FeO nanoparticle 100, enhances the growth performance of carbon nanotubes.

A second comparison example for comparing with the practical examples according to this disclosure, and a second practical example, a third practical example, and a fourth practical examples according to this disclosure will be described below. In each of the second comparison example, the second practical example, the third practical example, and the fourth practical example, Fe nanoparticles having different particle diameters are manufactured by controlling the molar ratio between the organic acid 212, which is an oleic acid, and the iron oxide 211, which is an $Fe_2O_3$ powder, and by controlling synthesis time for each example. The method of manufacturing the Fe nanoparticle for each example is identical to the method used in the first practical example except in the molar ratio between the organic acid 212, which is an oleic acid, and the iron oxide 211, which is the $Fe_2O_3$ powder, and in synthesis time. Accordingly, repetitive descriptions will be omitted.

Figure 6A:
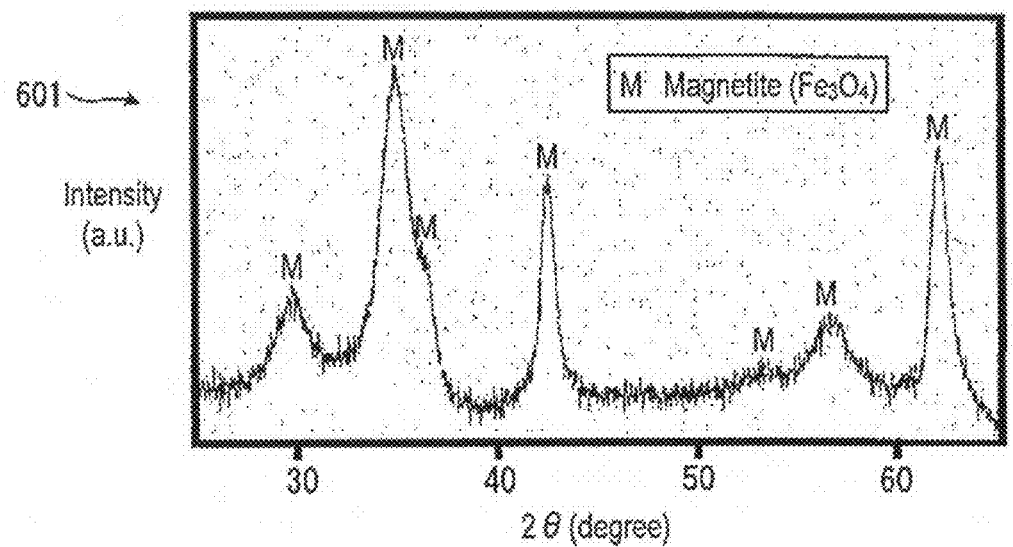
FIG. 6A is an X-ray diffraction pattern for a second comparison example.
Figure 6B:
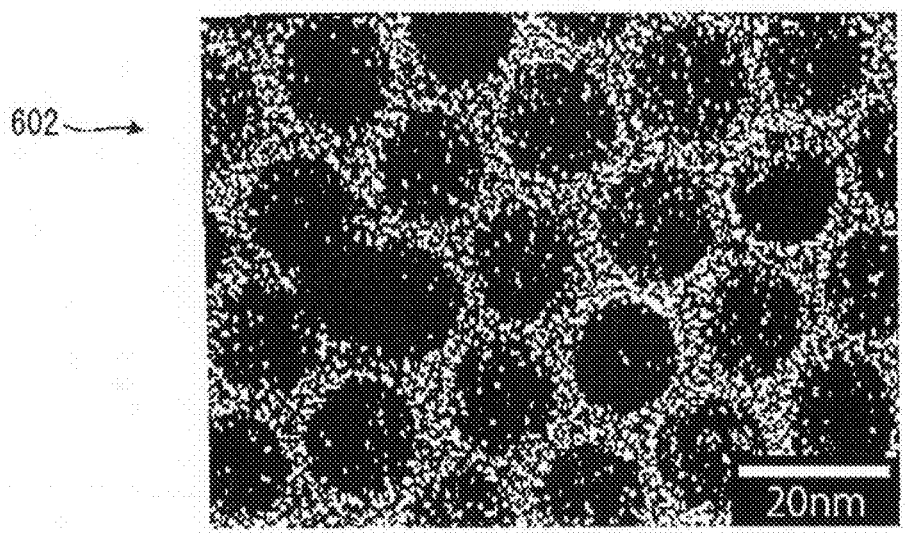
FIG. 6B is a transmission electron microscope image of Fe nanoparticles manufactured in the second comparison example.

The second comparison example will be described below. In the second comparison example, the molar ratio between the oleic acid and the $Fe_2O_3$ powder is controlled to 15 and the synthesis time is controlled to four hours for manufacturing the Fe nanoparticles. FIG. 6A is an X-ray diffraction pattern 601 of the Fe nanoparticles manufactured in the second comparison example and FIG. 6B is a TEM image 602 of the Fe nanoparticles manufactured in the second comparison example. From the X-ray diffraction pattern 601 and the TEM image 602, the Fe nanoparticles manufactured in the second comparison example are recognized as $Fe_3O_4$ nanoparticles having the $Fe_3O_4$ structures as main components. The average particle diameter of the $Fe_3O_4$ nanoparticles is 14 nm where the particle diameter distribution of the $Fe_3O_4$ nanoparticles is in a range of 12 nm to 15 nm.

Figure 7A:
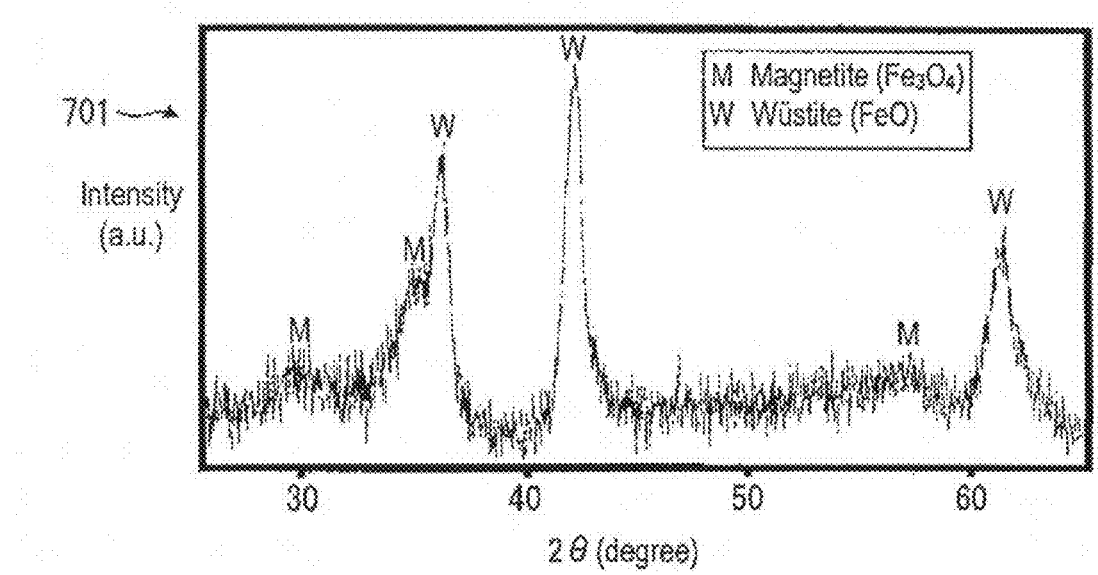
FIG. 7A is an X-ray diffraction pattern for a second practical example.
Figure 7B:
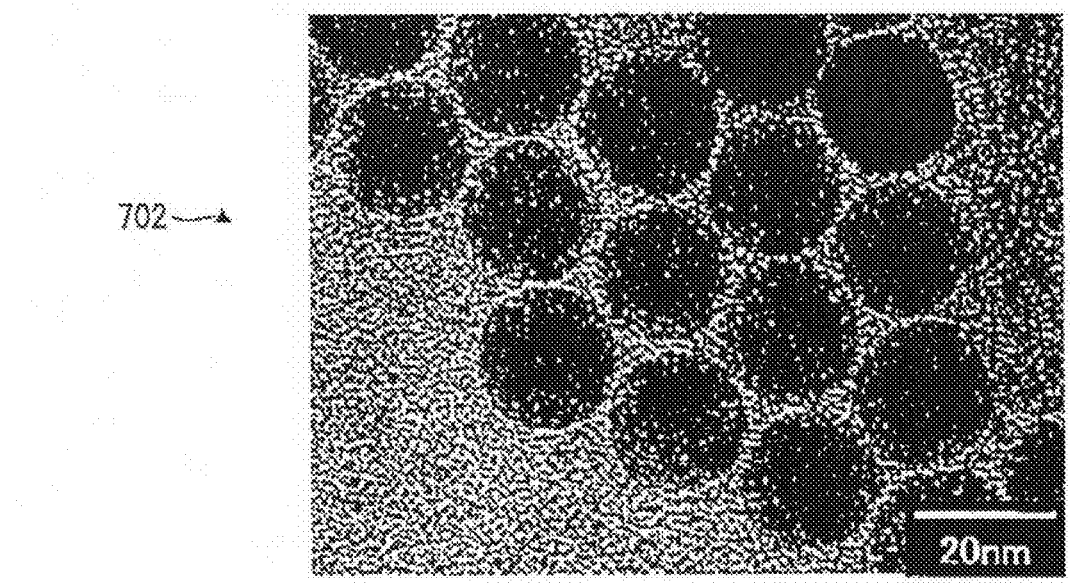
FIG. 7B is a transmission electron microscope image of Fe nanoparticles manufactured in the second practical example.

The second practical example will be described below. In the second practical example, the molar ratio between the oleic acid and the $Fe_2O_3$ powder is controlled to 18 and the synthesis time is controlled to five hours for manufacturing the Fe nanoparticles. FIG. 7A is an X-ray diffraction pattern 701 of the Fe nanoparticles manufactured in the second practical example and FIG. 7B is a TEM image 702 of the Fe nanoparticles manufactured in the second practical example. From the X-ray diffraction pattern 701 and the TEM image 702, the Fe nanoparticles manufactured in the second practical example are recognized as the FeO nanoparticles 100 having FeO structures as main components. The average particle diameter of the FeO nanoparticles 100 is 20 nm where the particle diameter distribution of the FeO nanoparticles 100 is in a range of 18 nm to 21 nm.

Figure 8A:
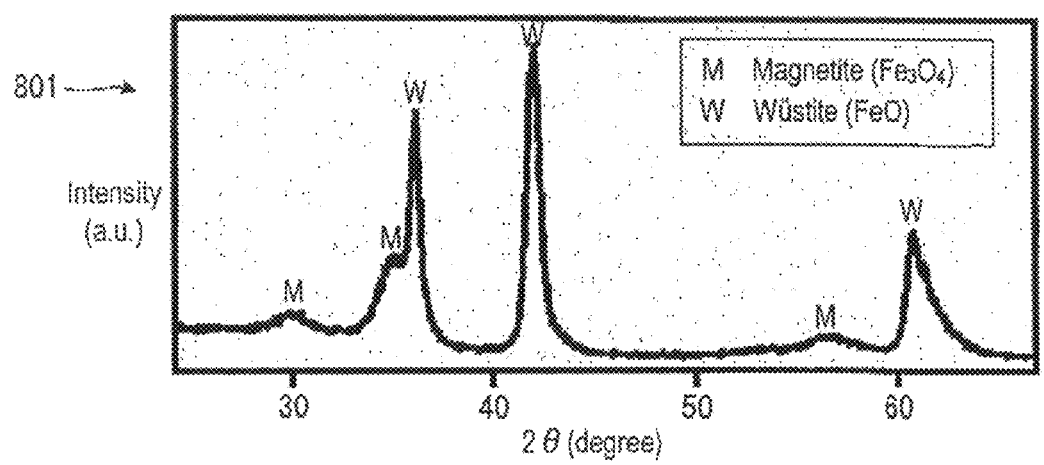
FIG. 8A is an X-ray diffraction pattern for a third practical example.
Figure 8B:
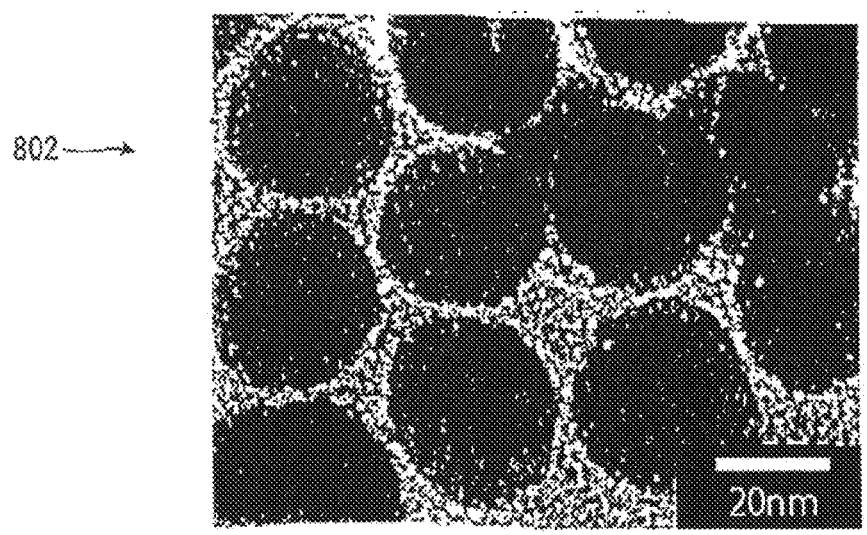
FIG. 8B is a transmission electron microscope image of Fe nanoparticles manufactured in the third practical example.

The third practical example will be described below. In the third practical example, the molar ratio between the oleic acid and the $Fe_2O_3$ powder is controlled to 30 and the synthesis time is controlled to seven hours for manufacturing the Fe nanoparticles. FIG. 8A is an X-ray diffraction pattern 801 of the Fe nanoparticles manufactured in the third practical example and FIG. 8B is a TEM image 802 of the Fe nanoparticles manufactured in the third practical example. From the X-ray diffraction pattern 801 and the TEM image 802, the Fe nanoparticles manufactured in the third practical example are recognized as FeO nanoparticles 100 having FeO structures as main components. The average particle diameter of the FeO nanoparticles 100 is 28 nm where the particle diameter distribution of the FeO nanoparticles 100 is in a range of 26 nm to 29 nm.

Figure 9A:
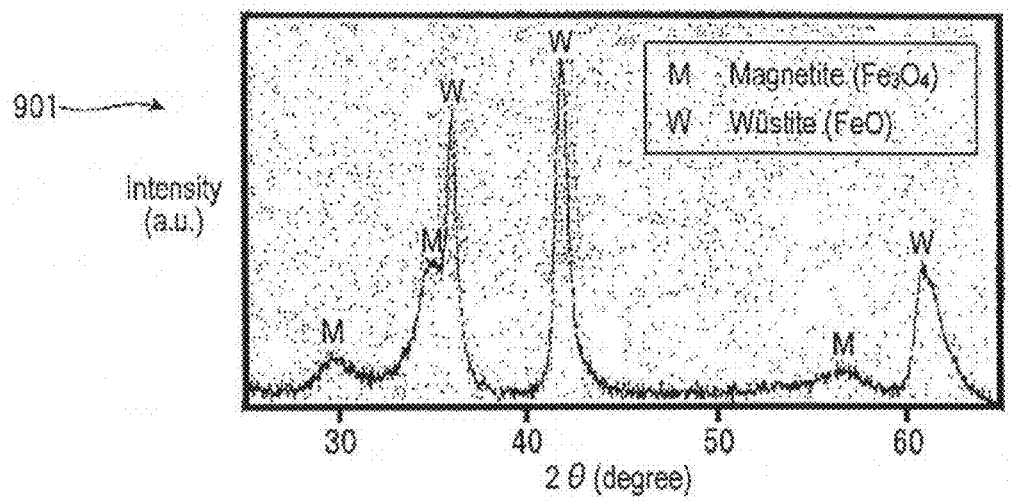
FIG. 9A is an X-ray diffraction pattern for a fourth practical example.
Figure 9B:
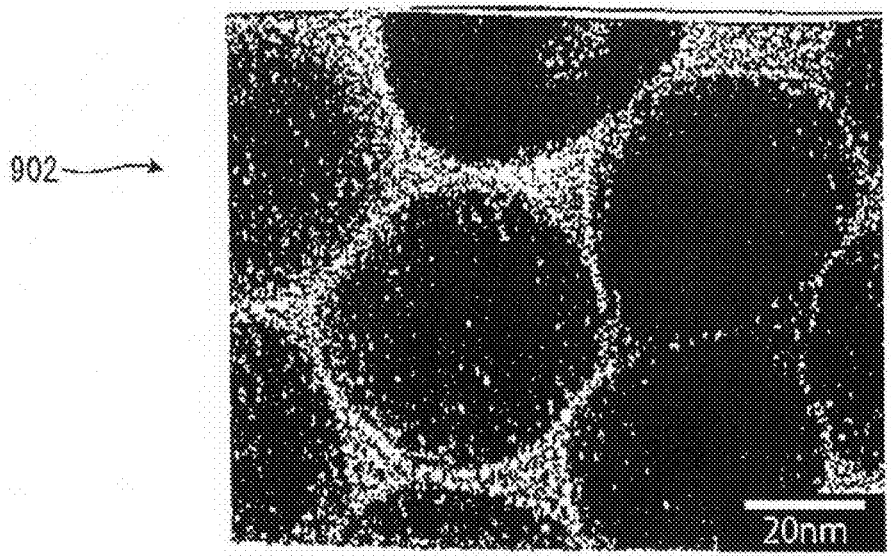
FIG. 9B is a transmission electron microscope image of Fe nanoparticles manufactured in the fourth practical example.

The fourth practical example will be described below. In the fourth practical example, the molar ratio between the oleic acid and the $Fe_2O_3$ powder is controlled to 45 and the synthesis time is controlled to ten hours for manufacturing the Fe nanoparticles. FIG. 9A is an X-ray diffraction pattern 901 of the Fe nanoparticles manufactured in the fourth practical example and FIG. 9B is a TEM image 902 of the Fe nanoparticles manufactured in the fourth practical example. From the X-ray diffraction pattern 901 and the TEM image 902, the Fe nanoparticles manufactured in the fourth practical example are recognized as FeO nanoparticles 100 having FeO structures as main components. The average particle diameter of the FeO nanoparticles is 45 nm where the particle diameter distribution of the FeO nanoparticles is in a range of 43 nm to 46 nm.

TABLE 1

| | Organic acid/Iron oxide (Molar ratio) | First maintaining time (Hour) | Second maintaining time (Hour) | Synthesis time (Hour) | Average particle diameter (nm) | Particle diameter distribution (nm) | Main component |
|---|---|---|---|---|---|---|---|
| Second comparison example | 15 | 1 | 3 | 4 | 14 | 12 to 15 | $Fe_3O_4$ |
| First comparison Example | 6 | 1 | 4 | 5 | 15 | — | $Fe_3O_4$ |
| Second practical example | 18 | 2 | 3 | 5 | 20 | 18 to 21 | FeO |
| Third practical example | 30 | 4 | 3 | 7 | 28 | 26 to 29 | FeO |
| First practical example | 30 | 4 | 4 | 8 | 30 | — | FeO |
| Fourth practical example | 45 | 6 | 4 | 10 | 45 | 43 to 46 | FeO |

The results summarized in Table 1 lead to a recognition that the particle diameter of the Fe nanoparticle is favorably equal to or more than 17 nm so as to form the FeO nanoparticle 100. The particle diameter that is equal to or more than 18 nm is more favorable. Further, the particle diameter that is equal to or more than 20 nm is more favorable.

A fifth practical example according to this disclosure will be described below. In the fifth practical example, the concentration of FeO nanoparticles 100 is controlled so that the absorbance of light of the liquid in which the FeO nanoparticles 100 manufactured in the first practical example are dispersed becomes equal to or greater than 2.00 so as to produce the catalyst supporting base plate 1003. Presumably, as a result, equal to or more than four times the amount of the FeO nanoparticles 100 per unit area is supported on the catalyst supporting base plate 1003 compared to the first practical example. In the fifth practical example, carbon nanotubes 1004 are formed by using the mentioned catalyst supporting base plate 1003 and by using the method identical to that of the first practical example.

Figure 10:
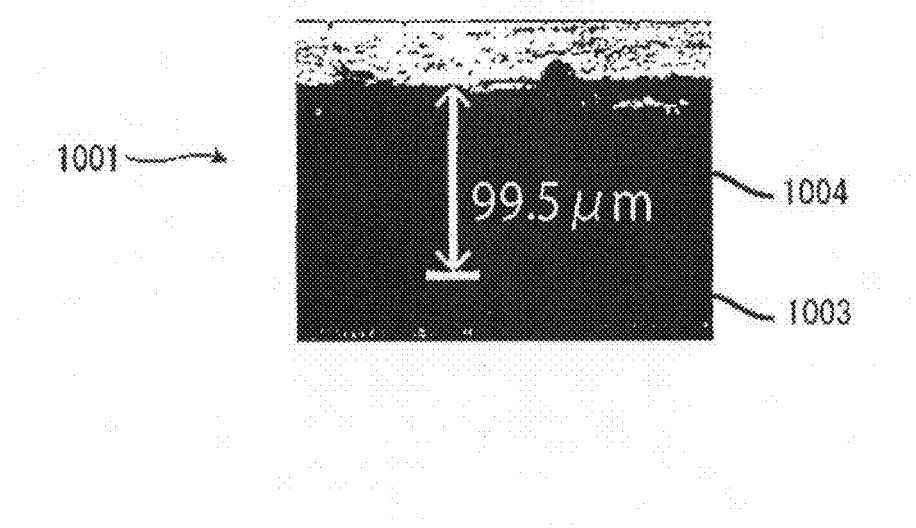
FIG. 10A is a scanning electron microscope image of carbon nanotubes formed in a fifth practical example.
FIG. 10B is a transmission electron microscope image of the carbon nanotube formed in the fifth practical example.
Figure 10:
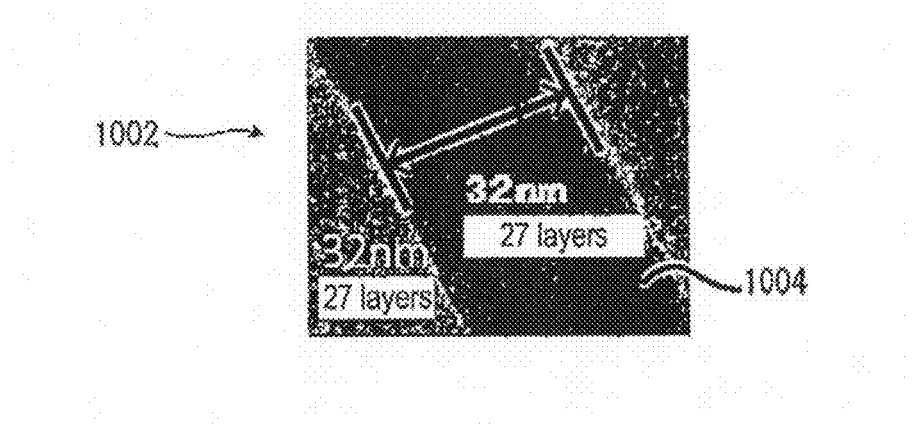

FIG. 10A is a SEM image 1001 of the carbon nanotubes 1004 formed in the fifth practical example, in which the carbon nanotubes 1004 are formed by using the catalyst supporting base plate 1003 supporting the FeO nanoparticles 100 having the average particle diameter of 30 nm manufactured in the fifth practical example. FIG. 10B is a TEM image 1002 of the mentioned carbon nanotube 1004. The SEM image 1001 shows that the length of the carbon nanotubes 1004 formed on the catalyst supporting base plate 1003 supporting the FeO nanoparticles 100 having the average particle diameter of 30 nm is approximately 99.5 μm. The TEM image 1002 shows that the outer diameter of the carbon nanotube 1004 is approximately 32 nm and number of layers of the carbon nanotube 1004 is 27. The length of the carbon nanotubes 1004 formed on the catalyst supporting base plate 1003 supporting the FeO nanoparticles 100 having average particle diameter of 30 nm manufactured in the fifth practical example is approximately 2.6 times longer than the length of the carbon nanotubes 402 formed in the first practical example. The result leads to a recognition that increasing the concentration of the FeO nanoparticles 100 supported on a catalyst supporting base plate enhances the growth performance of carbon nanotubes.

Figure 12:
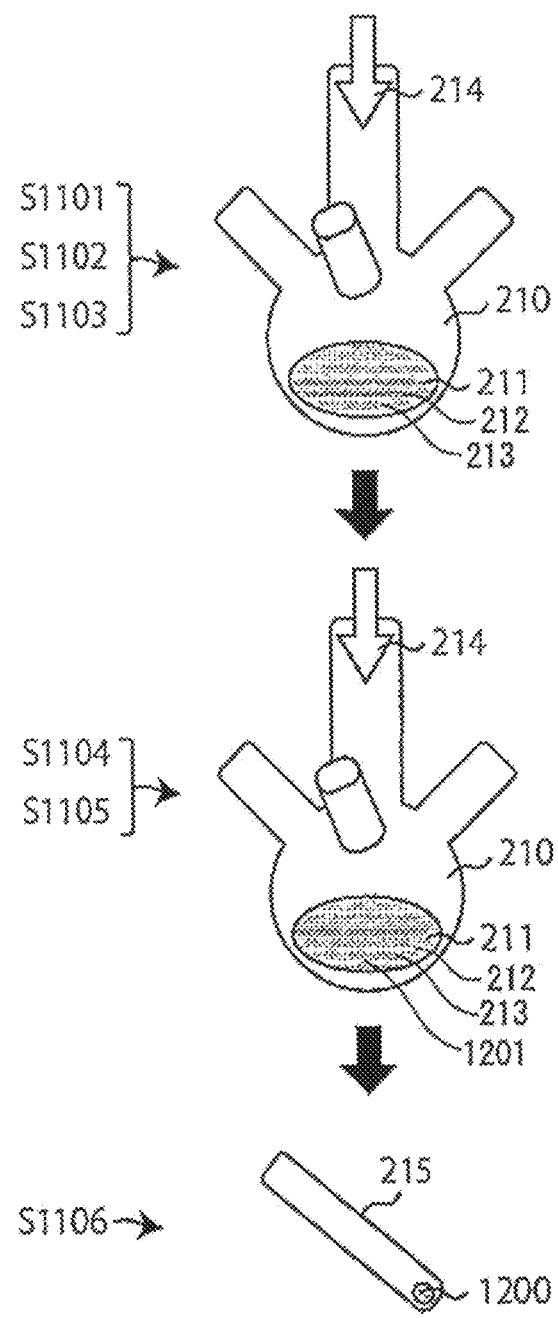
FIG. 12 is a schematic view drawing illustrating the method of manufacturing the FeO nanoparticle according to the second embodiment.

The method of manufacturing the ferrous oxide (FeO) nanoparticle 1200, the method of forming the carbon nanotube 1302, and the ferrous oxide (FeO) nanoparticle 1200 according to the second embodiment will be described. The method of manufacturing a ferrous oxide (FeO) nanoparticle 1200 will be described first. FIG. 11 is a flowchart showing the method of manufacturing the FeO nanoparticle 1200 according to the second embodiment. FIG. 12 is a schematic view drawing illustrating the method of manufacturing the FeO nanoparticle 1200 according to the second embodiment. The method of manufacturing the FeO nanoparticle 1200 according to the second embodiment and the method of manufacturing the FeO nanoparticle 1200 in sixth to eighth practical examples according to the second embodiment use the method known as the liquid-phase method. The manufacturing apparatus 300 and the method of forming the carbon nanotube 1302 for use in the second embodiment are similar to those used in the first embodiment and the descriptions in detail will be omitted.

In step S1101, an iron oxide 211, which is the basic material for forming the FeO core 101, an organic acid 212, and a first solvent 213 are mixed in a flask 210. The iron oxide 211, the organic acid 212, and the first solvent 213 are identical to those used in the first embodiment and the descriptions in detail of those will be omitted.

In step S1102, which serves as a water removing step, after the atmosphere in the flask 210 is substituted with an inactive gas 214, for example, argon or nitrogen, water in the solution in the flask 210 is removed by raising the temperature of the solution in the flask 210 to a first temperature. The first temperature is a temperature equal to or higher than the boiling point of water. The first temperature favorably is the temperature between 100° C. and 130° C.

In step S1103, which serves as a second temperature maintaining step, the temperature of the solution in the flask 210 is raised from the first temperature to a second temperature while churning the solution in the flask 210. The second temperature, which is a temperature equal to or lower than the boiling point of the first solvent 213, is obtained from experiences. In a case where the second temperature is too low, the FeO core may not be formed. The second temperature is a temperature in consideration of the temperature in which the FeO core forms and the boiling point of the first solvent 213. Accordingly, the second temperature favorably is a temperature between 280° C. and 360° C.

In step S1104, a second solvent 1201 is added to the solution while maintaining the temperature of the solution in the flask 210 at the second temperature and churning the solution. The step S1104 serves as the step of adding the second solvent 1201. The examples of the second solvent 1201 are an amine series solvent and an alcohol with alkyl chain having high boiling point. The second solvent 1201 is a surface-active agent that reacts with the surfactant 102, which is the organic acid 212, adhered to the FeO core 101 in the solution in the flask 210 and weakly coordinated to the FeO core 101 compared to the organic acid 212. More specifically, the examples of the second solvent 1201 are oleylamine, stearylamine, 1-hexadecanol, 1-octadecanol, and 1,2-hexadecanediol. The second solvent 1201 reacts with the surfactant 102, which is the organic acid 212, adhered to the FeO core 101 so that the FeO cores 101 removed of the surfactant 102 agglomerate and fuse with each other. As a result, the particle diameter of the FeO nanoparticles 1200 manufactured by adding the second solvent 1201 becomes larger compared to the particle diameter of FeO nanoparticles manufactured by not adding the second solvent 1201. The second solvent 1201 is a solvent for increasing the particle diameter of the FeO nanoparticles. Accordingly, in the second embodiment, the second solvent 1201 may be referred to as a particle diameter increasing solvent.

In step S1105, which serves as a second temperature maintaining step, the second temperature of the solution in the flask 210 is maintained and the churning is continued for a predetermined length of synthesis time. After that, the temperature of the solution in the flask 210 is lowered to a room temperature and the reacted solution in which the FeO nanoparticles 1200 are dispersed is removed from the flask 210.

In step S1106, which serves as a particle extracting step, the reacted solution in which the FeO nanoparticles 1200 are dispersed is displaced to a centrifuge tube 215 and with, for example, an ethanol or a hexane, and by using a centrifugal machine, unreacted substances are removed from the reacted solution through a refinement process so as to extract the FeO nanoparticles 1200 in a paste form. The extracted FeO nanoparticles 1200 may be dried into a powder form at this time. The particle diameter of the FeO nanoparticles 1200 is measured by using, for example, a transmission electron microscope (TEM) or a scanning electron microscope (SEM), or by optical absorptiometry.

A sixth practical example according to this disclosure will be described. Manufacturing of the FeO nanoparticle 1200 will be described first. In the sixth practical example, the FeO nanoparticles 1200 are manufactured by using $Fe_2O_3$ powder as the iron oxide 211, an oleic acid as the organic acid 212, and 1-octadecene as the first solvent 213, and oleylamine as the second solvent, which is the particle diameter increasing solvent.

Similar to the first practical example, in step S1101, 3 mmol of the iron oxide 211 ($Fe_2O_3$ powder), 90 mmol of the oleic acid, 20 ml of 1-octadecene are mixed in a flask 210, which is four-necked. The atmosphere in the flask 210 is then substituted with an argon gas for 60 minutes. After that, in step S1102, the temperature of the solution in the flask 210 is raised to 130° C., which is the first temperature, for 30 minutes and removed water in the solution. In step S1103, the temperature of the solution in the flask 210 is raised to 320° C., which is the second temperature, by using a heater, for example, a mantle heater, while churning the solution in the flask 210. In step S1104, while the temperature of the solution in the flask 210 is maintained at 320° C. and while churning is continued, 18 mmol of oleylamine is added to the solution in the flask 210 after 30 minutes has elapsed from a point in time at which the temperature of the solution in the flask 210 has reached 320° C. After that, in step S1105, the temperature of the solution is maintained at 320° C. for fifteen hours of synthesis time while churning the solution in the flask 210 for reactions to occur. Then, the temperature of the solution is lowered to the room temperature and the reacted solution in which Fe nanoparticles are dispersed is removed from the flask 210. The first temperature, which is 130° C., is raised so as to reach the second temperature, which is 320° C., by taking 20 to 30 minutes.

In step S1106, in order to remove unreacted substances, the reacted solution is placed in a centrifuge tube 215 and centrifuged at the rotational speed of 1500 rpm for 20 minutes. After that, a supernatant solution containing the Fe nanoparticles is separated and the supernatant solution, hexane, and ethanol are mixed in another centrifuge tube 215 in ratio of 1:1:2 and centrifuged at the rotational speed of 5800 rpm for 30 minutes. The processes of separating the supernatant solution, of mixing the supernatant solution, hexane, and ethanol, and of centrifugation are repeated for three to four times and the precipitated Fe nanoparticles in paste form are extracted.

FIG. 13A is an X-ray diffraction pattern of the Fe nanoparticles for the sixth practical example. Relatively weak diffraction peaks due to the $Fe_3O_4$ structures, in other words due to the magnetites, which are indicated with M in FIG. 13A, and relatively strong diffraction peaks due to the ferrous oxide (FeO) structures, in other words due to the wüstites, which are indicated with W in FIG. 13A, are recognized in the X-ray diffraction pattern. Therefore, a large amount of the Fe nanoparticles extracted in the sixth practical example is recognized as the FeO nanoparticles 1200.

Figure 13B:
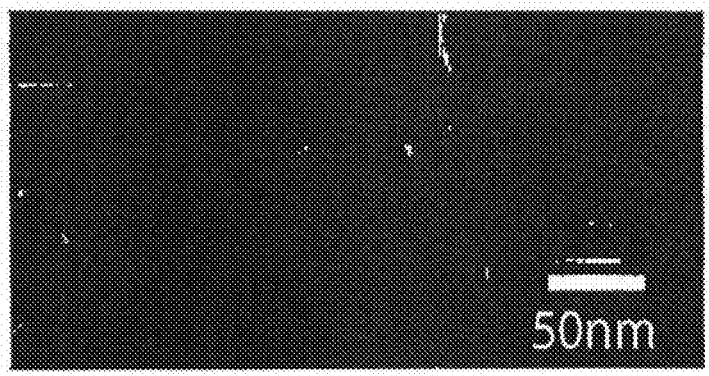
FIG. 13B is a transmission electron microscope image of FeO nanoparticles manufactured in the sixth practical example.
Figure 13C:
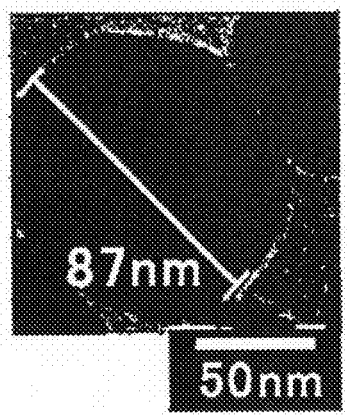
FIG. 13C is another transmission electron microscope image of the FeO nanoparticle manufactured in the sixth practical example.

FIG. 13B is a TEM image of the FeO nanoparticles 1200 manufactured in the sixth practical example. FIG. 13C is another TEM image of the FeO nanoparticle 1200 manufactured in the sixth practical example having the largest particle diameter. The TEM images show that the average particle diameter of the FeO nanoparticles 1200 manufactured in the sixth practical example is 75 nm. The particle diameter distribution of the FeO nanoparticles 1200 is in a range of 68 nm to 83 nm. In addition, as FIG. 13C shows that the FeO nanoparticle 1200 having the largest particle diameter is 87 nm in particle diameter.

Accordingly, in the sixth practical example, the FeO nanoparticles 1200 having larger average particle diameter of 75 nm are manufactured compared to the FeO nanoparticles 100 having average particle diameter of 30 nm manufactured in the first practical example. The FeO nanoparticles 1200 and the FeO nanoparticles 100 are manufactured under common conditions except in that the second solvent 1201 is added in the sixth practical example.

Forming of the carbon nanotubes 1302 in the sixth practical example by using the FeO nanoparticles 1200 manufactured in the sixth practical example as catalysts will be described next. First, the FeO nanoparticles 1200 are dispersed in hexane and the concentration of the FeO nanoparticles 1200 in the liquid is controlled so that the absorbance of light becomes 0.74 when measured by a colorimeter (CO7500 manufactured by WPA) under the measurement conditions of wavelength of 680 nm. A silicon base plate (manufactured by SAMCO) is immersed in the liquid containing the FeO nanoparticles 1200 being dispersed therein, the liquid in which the concentration is controlled, and then the silicon base plate is pulled out of the liquid into air under the room temperature with a speed of 3 millimeters/minute. After that, the silicon base plate is dried naturally and hexane is evaporated. Accordingly, a catalyst supporting base plate 1301 supporting the FeO nanoparticles 1200 is produced.

Then, the catalyst supporting base plate 1301 supporting the FeO nanoparticles 1200 is arranged in the chamber 305 of the manufacturing apparatus 300 and then the chamber 305 is vacuumed until the pressure inside the chamber 305 becomes 10 Pa. After that, a nitrogen gas serving as the carrier gas is introduced into the chamber 305 at the flow rate of 2.5 liters/minute so as to adjust the pressure inside the chamber 305 becomes 96 kPa. Then, the surface temperature of the catalyst supporting base plate 1301 is raised so as to reach 850° C. by taking 10 minutes and an acetylene gas serving as the fuel gas is added to the nitrogen gas at the flow rate of 0.5 liters/minute for 25 minutes into the chamber 305. As a result, the carbon nanotubes 1302 are formed on the catalyst supporting base plate 1301.

Figure 13D:
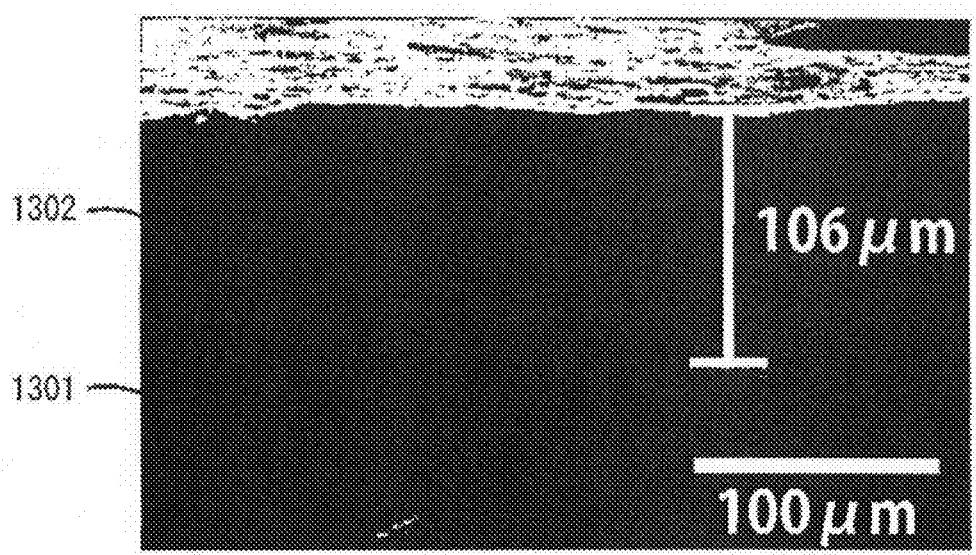
FIG. 13D is a scanning electron microscope image of carbon nanotubes formed in the sixth practical example.

FIG. 13D is a SEM image of the carbon nanotubes 1302 formed by using the catalyst supporting base plate 1301 supporting the FeO nanoparticles 1200 manufactured in the sixth practical example. The length of the carbon nanotubes 1302 formed on the catalyst supporting base plate 1301 supporting the FeO nanoparticles 1200 manufactured in the sixth practical example having the average particle diameter of 75 nm is approximately 106 μm.

Figure 13E:
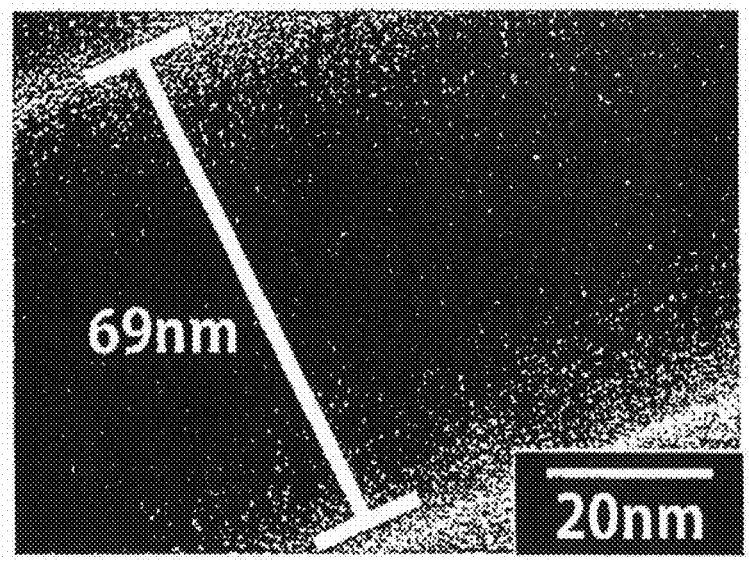
FIG. 13E is a transmission electron microscope image of the carbon nanotube formed in the sixth practical example.

FIG. 13E is a TEM image of the carbon nanotube 1302 formed by using the catalyst supporting base plate 1301 supporting the FeO nanoparticles 1200 manufactured in the sixth practical example. The outer diameter of the carbon nanotube 1302 is approximately 69 nm, which is close to the average particle diameter of the FeO nanoparticle 1200 manufactured in the sixth practical example that served as the catalyst, which is 75 nm.

By comparing the growth performance of the carbon nanotubes 1302 formed by using the catalyst supporting base plates 1301 supporting the FeO nanoparticles 1200 manufactured in the sixth practical example in which the length of the carbon nanotubes 1302 is approximately 106 μm with the growth performance of the carbon nanotubes 402 formed in the first practical example in which the length of the carbon nanotubes 402 is approximately 38.7 μm, the growth performance of the carbon nanotubes 1302 according to the sixth practical example is approximately three times greater than the growth performance of the carbon nanotubes 402 according to the first practical example. The results lead to a recognition that the FeO nanoparticle 1200 according to the sixth practical example enhances the growth performance of the carbon nanotube.

A seventh practical example according to this disclosure will be described. In the seventh practical example, the FeO nanoparticles 1200 are manufactured by using the same materials used in the sixth practical example that are the $Fe_2O_3$ powder, the oleic acid, 1-octadecene, and oleylamine and under almost identical manufacturing condition, except that the oleylamine is added to the solution from the beginning that is at the same time as step S1101.

First, 3 mmol of the iron oxide 211 ($Fe_2O_3$), 18 mmol of the oleic acid, 20 ml of 1-octadecene and 18 mmol of oleylamine are mixed in a flask 210, which is four-necked. The atmosphere in the flask 210 is then substituted with an argon gas for 60 minutes. After that, the temperature of the solution in the flask 210 is raised to 130° C. for 30 minutes and removed water in the solution. The temperature of the solution in the flask 210 is then raised to 320° C. and maintained at 320° C. while churning the solution in the flask 210 for ten hours for reactions to occur. Then, the temperature of the solution is lowered to the room temperature and the reacted solution in which Fe nanoparticles are dispersed is removed from the flask 210. The reacted solution is refined in the same method that is used in the sixth practical example so as to extract the precipitated Fe nanoparticles.

Figure 14A:
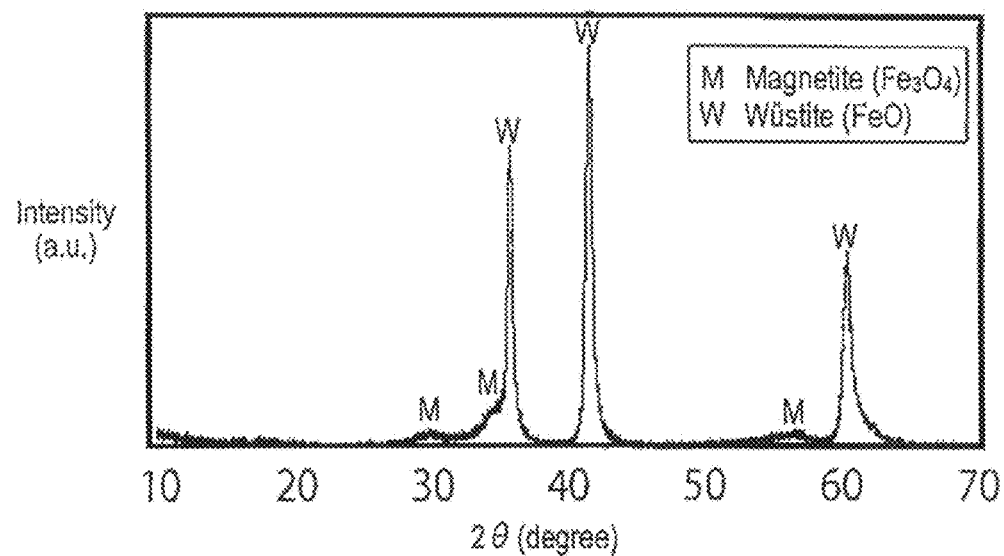
FIG. 14A is an X-ray diffraction pattern for a seventh practical example.

FIG. 14A is an X-ray diffraction pattern of the Fe nanoparticles for the seventh practical example. Relatively weak diffraction peaks due to the $Fe_3O_4$ structures, in other words due to the magnetites, which are indicated with M in FIG. 14A, and relatively strong diffraction peaks due to the ferrous oxide (FeO) structures, in other words due to the wüstites, which are indicated with W in FIG. 14A, are recognized in the X-ray diffraction pattern. Therefore, a large amount of the Fe nanoparticles extracted in the seventh practical example is recognized as the FeO nanoparticles 1200.

Figure 14B:
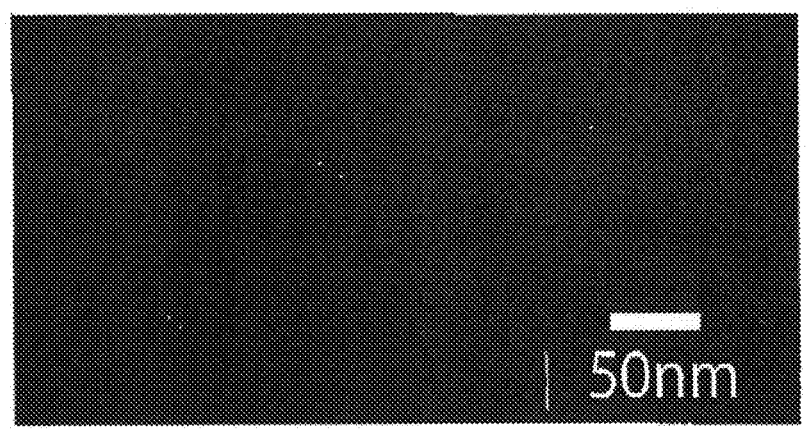
FIG. 14B is a transmission electron microscope image of the FeO nanoparticles manufactured in the seventh practical example.

FIG. 14B is a TEM image of the FeO nanoparticles 1200 manufactured in the seventh practical example. The TEM image shows that the average particle diameter of the FeO nanoparticles 1200 manufactured in the seventh practical example is 34 nm. The particle diameter distribution of the FeO nanoparticles 1200 is in a range of 23 nm to 43 nm.

The average particle diameter of the FeO nanoparticles 1200 manufactured in the seventh practical example, which is 34 nm, is larger than that of the FeO nanoparticles 100 manufactured in the first practical example, which is 30 nm, but is smaller than that of the FeO nanoparticles 1200 manufactured in the sixth practical example, which is 75 nm. Presumably, the reason is because the oleyleamine and the oleic acid, which serves as the organic acid 212, neutralize each other when the oleyleamine is added from the beginning and the iron oxide 211 ($Fe_2O_3$) is not smoothly dissolved by the oleic acid, which serves as the organic acid 212.

An eighth practical example according to this disclosure will be described. More specifically, the manufacturing of FeO nanoparticles 1200 will be described. In the eighth practical example, the FeO nanoparticles 1200 are manufactured by using the same materials used in the sixth practical example that are $Fe_2O_3$ powder as the iron oxide 211, the oleic acid as the organic acid 212, 1-octadecene as the first solvent 213, and oleylamine as the second solvent 1201. In the eighth practical example, the amount of oleylamine is reduced to 0.5 times the amount that is used in the sixth practical example and the synthesis time is defined at ten hours.

In step S1101, 3 mmol of the iron oxide 211 ($Fe_2O_3$ powder), 90 mmol of the oleic acid, 20 ml of 1-octadecene are mixed in a flask 210, which is four-necked. The atmosphere in the flask 210 is then substituted with an argon gas for 60 minutes. After that, in step S1102, the temperature of the solution in the flask 210 is raised to 130° C., which is the first temperature, for 30 minutes and removed water in the solution. In step S1103, the temperature of the solution in the flask 210 is raised to 320° C., which is the second temperature, by using a heater, for example, a mantle heater, while churning the solution in the flask 210. In step S1104, while the temperature of the solution in the flask 210 is maintained at 320° C. and while churning is continued, 9 mmol of oleylamine is added to the solution in the flask 210 after 30 minutes has elapsed from a point in time at which the temperature of the solution in the flask 210 has reached 320° C. After that, in step S1105, the temperature of the solution is maintained at 320° C. for ten hours of synthesis time while churning the solution in the flask 210 for reactions to occur. Then, the temperature of the solution is lowered to the room temperature and the reacted solution in which Fe nanoparticles are dispersed is removed from the flask 210. The first temperature, which is 130° C., is raised so as to reach the second temperature, which is 320° C., by taking 20 to 30 minutes.

In step S1106, in order to remove unreacted substances, the reacted solution is placed in a centrifuge tube 215 and centrifuged at the rotational speed of 1500 rpm for 20 minutes. After that, a supernatant solution containing the Fe image shows that the average particle diameter of the FeO nanoparticles 1200 manufactured in the eighth practical example is 40 nm. The particle diameter distribution of the FeO nanoparticles 1200 is in a range of 30 nm to 52 nm. The average particle diameter of the FeO nanoparticles 1200 manufactured in the eighth practical example, which is 40 nm, is smaller than that of the FeO nanoparticles 1200 manufactured in the sixth practical example, which is 75 nm, but is larger than that of the FeO nanoparticles 100 manufactured in the first practical example, which is 30 nm. Accordingly, the effectiveness of the oleylamine as the particle diameter increasing solvent is recognized.

Table 2 summarizes the results of the practical examples and comparison examples.

TABLE 2

| | Organic acid/Iron oxide (Molar ratio) | First maintaining time (Hour) | Second maintaining time (Hour) | Synthesis time (Hour) | Average particle diameter (nm) | Particle diameter distribution (nm) | Main component |
|---|---|---|---|---|---|---|---|
| Second comparison example | 15 | 1 | 3 | 4 | 14 | 12 to 15 | $Fe_3O_4$ |
| First comparison Example | 6 | 1 | 4 | 5 | 15 | — | $Fe_3O_4$ |
| Second practical example | 18 | 2 | 3 | 5 | 20 | 18 to 21 | FeO |
| Third practical example | 30 | 4 | 3 | 7 | 28 | 26 to 29 | FeO |
| First practical example | 30 | 4 | 4 | 8 | 30 | — | FeO |
| Seventh practical example | 30 | — | | 10 | 34 | 22 to 43 | FeO |
| Eighth practical example | 30 | — | | 10 | 40 | 30 to 52 | FeO |
| Fourth practical example | 45 | 6 | 4 | 10 | 45 | 43 to 46 | FeO |
| Sixth practical example | 30 | — | | 15 | 75 | 68 to 83 | FeO | nanoparticles is separated and the supernatant solution, hexane, and ethanol are mixed in another centrifuge tube 215 in ratio of 1:1:2 and centrifuged at the rotational speed of 5800 rpm for 30 minutes. The processes of separating the supernatant solution, of mixing the supernatant solution, hexane, and ethanol, and of centrifugation are repeated for three to four times and the precipitated Fe nanoparticles in paste form are extracted.

Figure 15A:
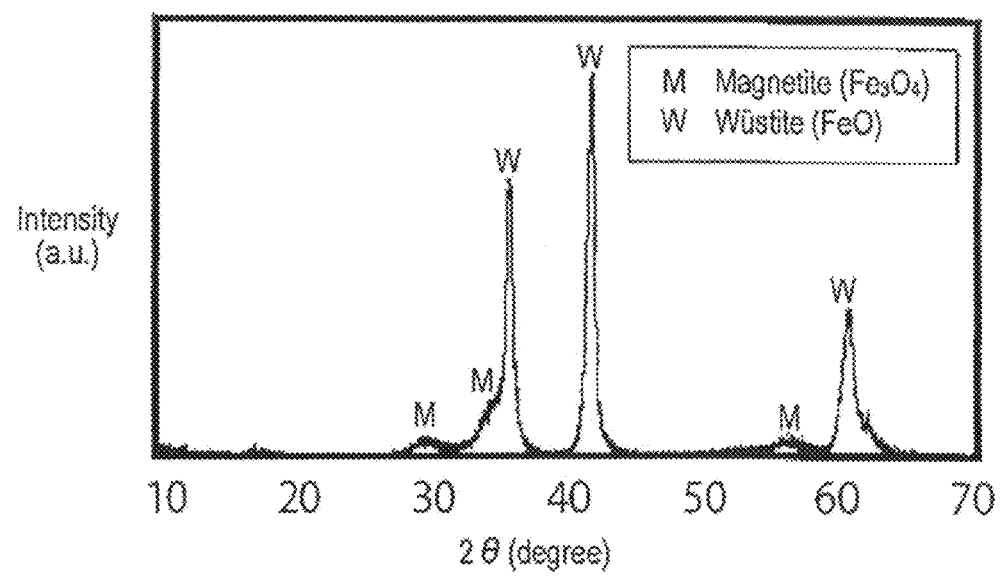
FIG. 15A is an X-ray diffraction pattern for an eighth practical example.

FIG. 15A is an X-ray diffraction pattern of the Fe nanoparticles for the eighth practical example. Relatively weak diffraction peaks due to the $Fe_3O_4$ structures, in other words due to the magnetites, which are indicated with M in FIG. 15A, and relatively strong diffraction peaks due to the ferrous oxide (FeO) structures, in other words due to the wüstites, which are indicated with W in FIG. 15A, are recognized in the X-ray diffraction pattern. Therefore, a large amount of the Fe nanoparticles extracted in the eighth practical example is recognized as the FeO nanoparticles 1200.

Figure 15B:
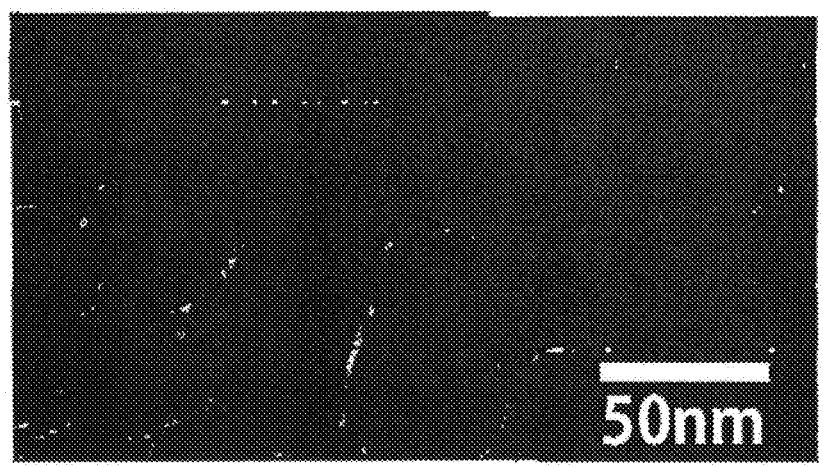
FIG. 15B is a transmission electron microscope image of the FeO nanoparticles manufactured in the eighth practical example.

FIG. 15B is a TEM image of the FeO nanoparticles 1200 manufactured in the eighth practical example. The TEM The method of manufacturing the FeO nanoparticle 100, 1200, the method of forming the carbon nanotube 402, 502, 1004, 1302, and the FeO nanoparticle 100, 1200 according to an alternative embodiment will be described. Alternatively, a shell layer, for example, an alloy of Fe and Ti, for enhancing the catalyst performance for forming a carbon nanotube may be formed around the FeO core 101.

According to an aspect of this disclosure, a method of manufacturing a ferrous oxide nanoparticle 100, 1200 includes a water removing step (step S202, step S1102) raising temperature of a solution containing an iron oxide 211, an organic acid 212 dissolving the iron oxide 211, and a first solvent 213 to a first temperature and removing water in the solution, a second temperature maintaining step (step S203, step S1103, step S1105) raising the first temperature to a second temperature and maintaining the second temperature, and a particle extracting step (step S204, step S1106) extracting the ferrous oxide nanoparticle 100, 1200 from the solution after the second temperature maintaining step (step S203, step S1103, step S1105).

Accordingly, the ferrous oxide (FeO) nanoparticle 100, 1200, or the Iron(II) oxide nanoparticle, is manufactured by using a liquid-phase method. Using the FeO nanoparticle 100, 1200 manufactured as such as a catalyst results in manufacturing a carbon nanotube 402, 502, 1004, 1302 having a large outer diameter while enhancing growth potential of the carbon nanotube 402, 502, 1004, 1302.

According to another aspect of this disclosure, the second temperature in the method of manufacturing the ferrous oxide nanoparticle 100, 1200 is maintained for a length of time in which a size of a particle extracted after the second temperature maintaining step (step S203, step S1103, step S1105) becomes equal to or larger than 17 nanometers in diameter.

Accordingly, the ferrous oxide (FeO) nanoparticle 100, 1200 is manufactured by using a liquid-phase method. Using the FeO nanoparticle 100, 1200 manufactured as such as the catalyst results in manufacturing a carbon nanotube 402, 502, 1004, 1302 having a large outer diameter while enhancing growth potential of the carbon nanotube 402, 502, 1004, 1302.

According to further aspect of this disclosure, the second temperature maintaining step (step S1103, step S1105) in the method of manufacturing the ferrous oxide nanoparticle 1200 includes a step of adding a second solvent 1201 (step S1104) reacting with the organic acid 212.

Accordingly, the ferrous oxide (FeO) nanoparticle 1200 is manufactured by using a liquid-phase method. Using the FeO nanoparticle 1200 manufactured as such as the catalyst results in manufacturing a carbon nanotube 1302 having a large outer diameter while enhancing growth potential of the carbon nanotube 1302.

According to another aspect of this disclosure, the organic acid 212 is an oleic acid and the second solvent 1201 is an oleylamine in the method of manufacturing the ferrous oxide nanoparticle 1200.

Accordingly, the ferrous oxide (FeO) nanoparticle 1200 is manufactured by using a liquid-phase method. Using the FeO nanoparticle 1200 manufactured as such as the catalyst results in manufacturing a carbon nanotube 1302 having a large outer diameter while enhancing growth potential of the carbon nanotube 1302.

According to further aspect of this disclosure, a method of forming a carbon nanotube 402, 502, 1004, 1302 includes the steps of producing a catalyst supporting base plate 309a, 401, 501, 1003, 1301 supporting a ferrous oxide nanoparticle 100, 1200 on a base plate 309, the ferrous oxide nanoparticle 100, 1200 manufactured by using a liquid-phase method and having a ferrous oxide structure as main component and having a particle size equal to or larger than 17 nanometers in diameter, and of forming a carbon nanotube 402, 502, 1004, 1302 on the catalyst supporting base plate 309a, 401, 501, 1003, 1301.

Using the ferrous oxide (FeO) nanoparticle 100, 1200 manufactured by using a liquid-phase method and having a ferrous oxide (FeO) structure as main component and having a particle size equal to or larger than 17 nm in diameter as a catalyst results in manufacturing a carbon nanotube 402, 502, 1004, 1302 having a large outer diameter while enhancing growth potential of the carbon nanotube 402, 502, 1004, 1302.

According to another aspect of this disclosure, the ferrous oxide nanoparticle 100, 1200 in the method of forming the carbon nanotube 402, 502, 1004, 1302 is formed by a method of manufacturing a ferrous oxide nanoparticle 100, 1200 including a water removing step (step S202, step S1102) raising temperature of a solution containing an iron oxide 211, an organic acid 212 dissolving the iron oxide 211, and a first solvent 213 to a first temperature and removing water in the solution, a second temperature maintaining step (step S203, step S1103, step S1105) raising the first temperature to a second temperature and maintaining the second temperature, and a particle extracting step (step S204, step S1106) extracting the ferrous oxide nanoparticle 100, 1200 from the solution after the second temperature maintaining step (step S203, step S1103, step 31105).

Accordingly, the ferrous oxide (FeO) nanoparticle 100, 200 is manufactured by using a liquid-phase method. Using the FeO nanoparticle 100, 1200 manufactured by using the liquid-phase method as described above and having the ferrous oxide (FeO) structure as main component and the particle size equal to or larger than 17 nm in diameter as the catalyst results in manufacturing a carbon nanotube 402, 502, 1004, 1302 having a large outer diameter while enhancing growth potential of the carbon nanotube 402, 502, 1004, 1302.

According to further aspect of this disclosure, a ferrous oxide nanoparticle 100, 1200 is manufactured by using a liquid-phase method, the ferrous oxide nanoparticle 100, 1200 having a ferrous oxide structure as main component and having a particle size equal to or larger than 17 nanometers in diameter.

Using the ferrous oxide (FeO) nanoparticle 100, 1200 manufactured by using a liquid-phase method and having the ferrous oxide (FeO) structure as main component and the particle size equal to or larger than 17 nm in diameter as the catalysts results in manufacturing a carbon nanotube 402, 502, 1004, 1302 having a large outer diameter while enhancing growth potential of the carbon nanotube 402, 502, 1004, 1302.

According to another aspect of this disclosure, the ferrous oxide nanoparticle 100, 1200 is manufactured by using the liquid-phase method including a water removing step (step S202, step S1102) raising temperature of a solution containing an iron oxide 211, an organic acid 212 dissolving the iron oxide 211, and a first solvent 213 to a first temperature and removing water in the solution, a second temperature maintaining step (step S203, step S1103, step S1105) raising the first temperature to a second temperature and maintaining the second temperature, and a particle extracting step (step S204, step S1106) extracting the ferrous oxide nanoparticle 100, 1200 from the solution after the second temperature maintaining step (step S203, step S1103, step S1105).

Accordingly, the ferrous oxide (FeO) nanoparticle 100, 1200 having the ferrous oxide (FeO) structure as main component and the particle size equal to or larger than 17 nm in diameter is manufactured by using a liquid-phase method. Using the FeO nanoparticle 100, 1200 manufactured as such as the catalyst results in manufacturing a carbon nanotube 402, 502, 1004, 1302 having a large outer diameter while enhancing growth potential of the carbon nanotube 402, 502, 1004, 1302.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method of manufacturing ferrous oxide nanoparticles, comprising:
increasing the temperature of a solution comprising water, an iron oxide, an organic acid dissolving the iron oxide, and a first solvent to a first temperature capable of removing water in the solution, thereby removing water from the solution;
thereafter raising the first temperature to a second temperature and maintaining the second temperature, the second temperature being greater than the first temperature;
thereafter synthesizing ferrous oxide nanoparticles at the second temperature; and
thereafter, extracting ferrous oxide nanoparticles from the solution,
wherein the molar ratio of organic acid to iron oxide during said synthesizing is from 6 to 100.

2. The method according to claim 1, wherein synthesis of said ferrous oxide nanoparticles at the second temperature is carried out for a length of time to produce nanoparticles having a diameter of equal to or larger than 17 nanometers.

3. The method according to claim 1, wherein,
when the temperature is set to the second temperature, the method further comprises adding a second solvent capable of reacting with the organic acid.

4. The method according to claim 3, wherein the organic acid is oleic acid and the second solvent is oleylamine.

5. The method according to claim 1, wherein the first temperature is from 100° C. to 130° C.

6. The method according to claim 1, wherein the second temperature is from 280° C. to 360° C.

7. The method according to claim 1, wherein the iron oxide present during said increasing comprises at least one member selected from the group consisting of FeO, $\alpha$-$Fe_2O_3$, $\gamma$-$Fe_2O_3$, $Fe_3O_4$, and $\alpha$-FeOOH.

8. The method according to claim 1, wherein the iron oxide present during said increasing comprises FeO.

9. The method according to claim 1, wherein the iron oxide present during said increasing comprises $\alpha$-$Fe_2O$.

10. The method according to claim 1, wherein the iron oxide present during said increasing comprises $\gamma$-$Fe_2O_3$.

11. The method according to claim 1, wherein the iron oxide present during said increasing comprises $\alpha$-$Fe_2O$ and $\gamma$-$Fe_2O_3$.

12. The method according to claim 1, wherein the extracting ferrous oxide nanoparticles from the solution is carried out by centrifuging the solution.

13. The method according to claim 1, wherein an average particle diameter of the ferrous oxide nanoparticles obtained from said extracting is from 15 to 30 nm.

14. A method of manufacturing ferrous oxide nanoparticles, comprising:
increasing the temperature of a solution comprising an iron oxide, an organic acid dissolving the iron oxide, and a first solvent to a first temperature capable of removing water in the solution, thereby removing any water present in the solution from the solution;
thereafter raising the first temperature to a second temperature and maintaining the second temperature, the second temperature being greater than the first temperature;
thereafter synthesizing ferrous oxide nanoparticles at the second temperature; and
thereafter, extracting ferrous oxide nanoparticles from the solution,
wherein the molar ratio of organic acid to iron oxide during said synthesizing is from 6 to 100.

* * * * *